(12) United States Patent
Hitotsuya et al.

(10) Patent No.: US 10,142,667 B2
(45) Date of Patent: *Nov. 27, 2018

(54) INFORMATION PROCESSING SYSTEM AND SERVER APPARATUS

(71) Applicant: PANASONIC INTELLECTUAL PROPERTY MANAGEMENT CO., LTD., Osaka (JP)

(72) Inventors: Masashi Hitotsuya, Osaka (JP); Naoya Takao, Hyogo (JP); Shota Hario, Osaka (JP); Kunio Gobara, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/914,379

(22) Filed: Mar. 7, 2018

(65) Prior Publication Data

US 2018/0199090 A1    Jul. 12, 2018

Related U.S. Application Data

(63) Continuation of application No. 15/306,074, filed as application No. PCT/JP2015/004751 on Sep. 17, 2015, now Pat. No. 9,948,971.

(30) Foreign Application Priority Data

Sep. 25, 2014    (JP) .................................. 2014-195544

(51) Int. Cl.
*H04N 21/278* (2011.01)
*H04N 5/76* (2006.01)
(Continued)

(52) U.S. Cl.
CPC ............. *H04N 21/278* (2013.01); *H04N 5/76* (2013.01); *H04N 5/765* (2013.01); *H04N 5/775* (2013.01);
(Continued)

(58) Field of Classification Search
CPC .. H04N 21/278; H04N 21/258; H04N 21/231; H04N 21/266; H04N 21/4334;
(Continued)

(56) References Cited

U.S. PATENT DOCUMENTS

2008/0066103 A1* 3/2008 Ellis .................. H04N 5/44591
725/38
2008/0184298 A1    7/2008 Kinoshita et al.
(Continued)

FOREIGN PATENT DOCUMENTS

JP    2006-067255 A    3/2006
JP    2008-172530 A    7/2008
(Continued)

OTHER PUBLICATIONS

Extended European Search Report dated Jul. 13, 2017 for the related European Patent Application 15844982.7.
(Continued)

*Primary Examiner* — Oschata I Montoya
(74) *Attorney, Agent, or Firm* — McDermott Will & Emery LLP

(57) ABSTRACT

A server apparatus includes a storage, an acquisition unit, and a controller. The storage stores association information that associates access information on the program processing apparatus corresponding to user identification information with the user identification information. The acquisition unit acquires the user identification information and program-specifying information that specifies a broadcast program. The controller specifies the access information on the association information from the user identification information. Then, the controller causes the program processing apparatus to perform processing regarding the broadcast
(Continued)

program specified by the program-specifying information acquired by the acquisition unit by using the access information.

11 Claims, 14 Drawing Sheets

(51) Int. Cl.
*H04N 21/258* (2011.01)
*H04N 21/231* (2011.01)
*H04N 21/266* (2011.01)
*H04N 21/433* (2011.01)
*H04N 21/435* (2011.01)
*H04N 21/84* (2011.01)
*H04N 21/845* (2011.01)
*H04N 5/775* (2006.01)
*H04N 5/765* (2006.01)
*H04N 21/2747* (2011.01)
*H04N 21/658* (2011.01)
*H04N 21/6587* (2011.01)

(52) U.S. Cl.
CPC ......... *H04N 21/231* (2013.01); *H04N 21/258* (2013.01); *H04N 21/266* (2013.01); *H04N 21/2747* (2013.01); *H04N 21/435* (2013.01); *H04N 21/4334* (2013.01); *H04N 21/6581* (2013.01); *H04N 21/6587* (2013.01); *H04N 21/84* (2013.01); *H04N 21/845* (2013.01)

(58) Field of Classification Search
CPC .... H04N 21/435; H04N 21/84; H04N 21/845; H04N 21/6587; H04N 21/6581; H04N 21/2747; H04N 5/76; H04N 5/765; H04N 5/775

See application file for complete search history.

(56) References Cited

U.S. PATENT DOCUMENTS

| | | | |
|---|---|---|---|
| 2013/0185752 A1 | 7/2013 | Itagaki et al. | |
| 2013/0276009 A1 | 10/2013 | Ajitomi et al. | |
| 2014/0282637 A1* | 9/2014 | Park | H04N 21/47214 725/5 |
| 2015/0012590 A1* | 1/2015 | Goodwin | H04N 21/25 709/203 |

FOREIGN PATENT DOCUMENTS

| | | |
|---|---|---|
| JP | 2010-278788 A | 12/2010 |
| JP | 2013-074457 A | 4/2013 |
| JP | 2013-115592 A | 6/2013 |

OTHER PUBLICATIONS

International Search Report of PCT application No. PCT/JP2015/004751 dated Nov. 24, 2015; with English translation.
Non-Final Office Action issued in U.S. Appl. No. 15/306,074, dated Jun. 12, 2017.
Notice of Allowance issued in U.S. Appl. No. 15/306,074, dated Dec. 14, 2017.

* cited by examiner

FIG. 4

| Association information 30 | | |
|---|---|---|
| User identification information 31 | Access information on program processing apparatus 32 | |
| A0123 (Login ID of user A) | 01010 (ID of program processing apparatus used by user A) | |
| B0321 (Login ID of user B) | 01012 (ID of program processing apparatus used by user B) | |
| ... | ... | |

FIG. 5

| ID of program processing apparatus | Recorded content location information | Program-specifying information |
|---|---|---|
| 01010 | 00005 (Recorded content ID) | 001002003 ··· |
| 01012 | 00012 (Recorded content ID) | 001002003 ··· |
| ⋮ | ⋮ | ⋮ |

FIG. 13

| Recording information 40a | | | |
|---|---|---|---|
| ID of program processing apparatus 41 | Area information 41a | Recorded content location information 42 | Program-specifying information 20 |
| 01010 | Tokyo | 00005 (Recorded content ID) | 001002003 ... |
| 01012 | Osaka | 00012 (Recorded content ID) | 001002003 ... |
| ... | ... | ... | ... |

FIG. 14

| Affiliated station information 70 | 71 Area | 72a A affiliation | 72b B affiliation | 72c C affiliation | ... |
|---|---|---|---|---|---|
| | Tokyo | Tokyo A television | B television Tokyo | C Tokyo broadcasting | ... |
| | Osaka | Osaka A television | B television Osaka | C Osaka broadcasting | ... |
| | ... | ... | ... | ... | ... |

INFORMATION PROCESSING SYSTEM AND SERVER APPARATUS

RELATED APPLICATIONS

This application is a Continuation application of U.S. patent application Ser. No. 15/306,074, filed on Oct. 21, 2016, now U.S. Pat. No. 9,948,971, which is a U.S. National Phase under 35 U.S.C. § 371 of International Patent Application No. PCT/JP2015/004751, filed on Sep. 17, 2015, which in turn claims the benefit of Japanese Application No. 2014-195544, filed on Sep. 25, 2014, the entire disclosures of which Applications are incorporated by reference herein.

TECHNICAL FIELD

The present disclosure relates to a server apparatus and an information processing system that perform remote control of a program processing apparatus.

BACKGROUND ART

Patent Literature 1 discloses a content receiving apparatus and an information processing apparatus. This content receiving apparatus receives and displays a message that cites information for identifying television programs. In addition, this information processing apparatus displays a web page including a button for recording reservation of programs by requesting acquisition of a web page in response to a user operation.

CITATION LIST

Patent Literature

PTL 1: Unexamined Japanese Patent Publication No. 2013-115592

SUMMARY

The present disclosure provides a server apparatus and an information processing system that perform remote control of a program processing apparatus that processes a broadcast program based on an instruction from a terminal apparatus.

A server apparatus according to the present disclosure includes a storage, an acquisition unit, and a controller. The storage stores association information that associates access information on a program processing apparatus corresponding to user identification information with the user identification information. The acquisition unit acquires the user identification information and program-specifying information that specifies a broadcast program. The controller specifies the access information on the association information from the user identification information. Then, the controller causes the program processing apparatus to perform processing regarding the broadcast program specified by the program-specifying information acquired by the acquisition unit by using the access information.

An information processing system according to the present disclosure includes a terminal apparatus, a server apparatus, and a program processing apparatus. The server apparatus includes an acquisition unit, a storage, and a controller. The acquisition unit acquires, from the terminal apparatus, user identification information and program-specifying information that specifies a broadcast program. The storage stores association information for each user registered in the server apparatus. The association information is information that associates the user identification information with access information on the program processing apparatus. The controller specifies the access information based on the association information and the user identification information acquired by the acquisition unit. Then, the controller accesses the program processing apparatus by using the access information, and causes the program processing apparatus to perform processing regarding the broadcast program specified by the program-specifying information acquired by the acquisition unit.

A control program according to the present disclosure is a control program for causing a computer including a processor to perform server processing. The server processing includes an acquisition step of acquiring user identification information and program-specifying information that specifies a broadcast program, and a control step. The control step is a step of specifying access information based on association information and the user identification information acquired in the acquisition step. The association information is information that associates the user identification information with the access information on the program processing apparatus. The control step is a step of accessing the program processing apparatus by using the access information, and causing the program processing apparatus to perform processing regarding the broadcast program specified by the program-specifying information acquired in the acquisition step.

The information processing system and the server apparatus according to the present disclosure can improve convenience of a user who performs remote control of the program processing apparatus.

BRIEF DESCRIPTION OF DRAWINGS

FIG. 4 is a diagram schematically illustrating one configuration example of association information according to the first exemplary embodiment.

FIG. 5 is a diagram schematically illustrating one configuration example of recording information according to the first exemplary embodiment.

FIG. 13 is a diagram schematically illustrating one configuration example of the recording information according to another exemplary embodiment.

FIG. 14 is a diagram schematically illustrating one configuration example of affiliated station information according to another exemplary embodiment.

DESCRIPTION OF EMBODIMENTS

Figure 1:
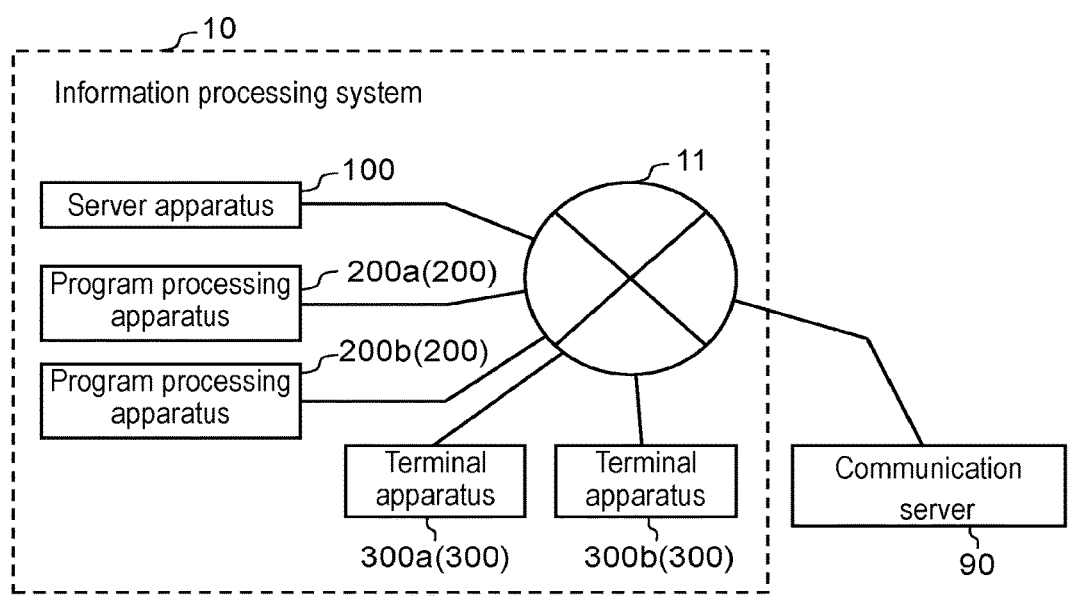
FIG. 1 is a diagram schematically illustrating one configuration example of an information processing system according to a first exemplary embodiment.

Exemplary embodiments will be described in detail below with reference to the drawings as needed. However, a description more detailed than necessary may be omitted. For example, a detailed description of already well-known matters and a repeated description regarding substantially identical components may be omitted. This is intended to avoid making the following description unnecessarily redundant and to make it easier for a person skilled in the art to understand the exemplary embodiments.

It is to be noted that the accompanying drawings and the following description are provided in order for a person skilled in the art to fully understand the present disclosure, and are not intended to limit the subject described in the appended claims.

That is, numerical values, shapes, materials, components, arrangement and connection forms of the components, steps (processes), order of the steps, and the like described in the following description using specific examples are merely one example, and are not intended to limit the subject described in the appended claims. Among components described in the following exemplary embodiments, components that are not described in the independent claims are components that may be added as necessary.

In addition, each diagram is a schematic view and is not necessarily illustrated strictly. In addition, in each diagram, identical reference numerals are used to refer to identical components.

First Exemplary Embodiment

A first exemplary embodiment will be described below with reference to FIG. 1 to FIG. 12.

[1-1. Configuration]

FIG. 1 is a diagram schematically illustrating one configuration example of information processing system 10 according to the first exemplary embodiment.

Information processing system 10 includes server apparatus 100, program processing apparatus 200a, program processing apparatus 200b, terminal apparatus 300a, and terminal apparatus 300b. These apparatuses are communicatively connected to each other via line network 11. Line network 11 is a network that connects devices having communication functions to be communicative with each other, and for example, line network 11 may include wide area networks, such as the Internet.

Communication server 90, which is an external apparatus, is also connected to line network 11. Each apparatus of information processing system 10 can also communicate with communication server 90 via line network 11.

It is to be noted that the program processing apparatuses included in information processing system 10 are not limited to two sets at all, and the terminal apparatuses included in information processing system 10 are not limited to two sets at all, either.

Server apparatus 100 is a server computer that provides a user with a service regarding a broadcast program, and is configured to perform remote control of the program processing apparatuses in accordance with instructions from the terminal apparatuses. Server apparatus 100 includes components such as a processor, a memory, a storage medium such as a hard disk drive, and a communication interface in a similar manner to a general server computer (not illustrated). It is to be noted that this broadcast program is a program transmitted from a broadcasting station such as a television broadcasting station and a radio broadcasting station through broadcast waves or communication channels such as communication cables.

Each of program processing apparatus 200a and program processing apparatus 200b is one example of the program processing apparatuses. Hereinafter, program processing apparatus 200a and program processing apparatus 200b are generically referred to as "program processing apparatus 200". Program processing apparatus 200 is a recording and playback apparatus that has a function of receiving and recording at least one of a video signal and an audio signal that constitute a broadcast program, and a function of playing the recorded signal. Program processing apparatus 200 is, for example, a television receiver, a radio receiver, a moving picture (audio) playback apparatus, a moving picture (audio) recording apparatus, or a recording and playback apparatus. It is to be noted that in the present exemplary embodiment, although program processing apparatus 200 is assumed to be a recording and playback apparatus that has functions such as a function of receiving and recording one or more broadcast programs in response to a user operation and a function of performing recording reservation (scheduling of recording), the present disclosure is not limited to this configuration at all. Program processing apparatus 200 includes components such as a processor, a memory, a storage medium such as a hard disk drive, a broadcast receiving circuit, and a communication interface in a similar manner to a general recording and playback apparatus (not illustrated).

Each of terminal apparatus 300a and terminal apparatus 300b is one example of the terminal apparatuses. Hereinafter, terminal apparatus 300a and terminal apparatus 300b are generically referred to as "terminal apparatus 300". Terminal apparatus 300 is an apparatus that includes a user interface for receiving a user operation, and for example, terminal apparatus 300 is an apparatus such as a smartphone, a tablet computer, or a personal computer. It is to be noted that although terminal apparatus 300 is assumed to be a smartphone in the present exemplary embodiment, the present disclosure is not limited to this configuration at all. Terminal apparatus 300 includes components such as a memory, a processor, an input device, a display, and a communication interface in a similar manner to a general smartphone.

It is assumed that the above-described communication interface included in each apparatus is capable of performing transmission and reception (communication) of information with other apparatuses via line network 11. In addition, the above-described memory included in each apparatus is assumed to be, for example, a device such as a read only memory (ROM) and a random access memory (RAM). Such a memory is assumed to previously store software such as a control program to be described later for performing processing of each functional unit, setting values to be used by the control program, and the like. In addition, each memory may temporarily store parameters, information, or the like the processor uses when executing the control program. In addition, a nonvolatile memory may be included in each memory.

Communication server 90 is a server computer that assists communication between apparatuses connected to each other via line network 11. Communication server 90 is configured, for example, to assist users in exchanging messages with each other through a social networking service (SNS) and the like, to accumulate such information, and the like. On receipt of information from one of the apparatuses connected to line network 11, communication server 90 can transmit the received information to respective terminal apparatuses 300 so that a plurality of users may read the received information. Communication server 90 includes components such as a processor, a memory, a storage medium such as a hard disk drive, and a communication interface in a similar manner to a general server computer.

It is to be noted that in the present exemplary embodiment, "user A" and "user B" are assumed to be registered in server apparatus 100 in advance as the users who may use services provided by server apparatus 100. In addition, it is assumed that user A is a person who uses terminal apparatus 300a and program processing apparatus 200a, whereas user B is a person who uses terminal apparatus 300b and program processing apparatus 200b. In addition, it is assumed that terminal apparatus 300 is carried by each user, whereas program processing apparatus 200 is installed in a home. In addition, for each user, user identification information and information regarding program processing apparatus 200 used by the user are registered in server apparatus 100. It is to be noted that a number of users registered in server apparatus 100 is not limited to two at all.

The following describes one example of an operation of information processing system 10. However, the operation of information processing system 10 is not limited to the following operation at all.

On completion of recording of a broadcast program, program processing apparatus 200a transmits information for specifying the broadcast program (hereinafter referred to as "program-specifying information") to server apparatus 100.

On receipt of the program-specifying information, server apparatus 100 adds information for accessing server apparatus 100 (hereinafter referred to as "additional information") to the program-specifying information, and then transmits the information to communication server 90. Accordingly, these pieces of information are transmitted via communication server 90 to terminal apparatus 300a used by user A. It is to be noted that in the present exemplary embodiment, to connect from an apparatus to another apparatus through communication or to reach information included in another apparatus by an apparatus is referred to as "access".

Subsequently, when user A operates terminal apparatus 300a and then the program-specifying information indicating the broadcast program and information indicating the user operation performed on terminal apparatus 300a by user A are transmitted from terminal apparatus 300a to server apparatus 100, server apparatus 100 controls program processing apparatus 200a based on the program-specifying information and the information indicating the user operation. Then, server apparatus 100 causes program processing apparatus 200a to perform processing based on the user operation (for example, recording reservation or playback of the broadcast program corresponding to the program-specifying information, transmission of data for playback, or the like).

For example, when user A performs the user operation for specifying the broadcast program and the user operation for viewing the program on terminal apparatus 300a, information that indicates these user operations is transmitted from terminal apparatus 300a to server apparatus 100, and then server apparatus 100 controls program processing apparatus 200a based on the received information. Then, the data for playback of the broadcast program recorded in program processing apparatus 200a is transmitted from program processing apparatus 200a to terminal apparatus 300a. Terminal apparatus 300a receives and plays the data for playback, whereby a moving picture (broadcast program) based on the data for playback is displayed on a display of terminal apparatus 300a. In this way, user A can view the broadcast program specified by user A on a display of terminal apparatus 300a from among a plurality of broadcast programs recorded in program processing apparatus 200a.

Although description is omitted because of overlap, the configuration example illustrated in FIG. 1 enables transmission and reception of information similar to the foregoing also among server apparatus 100, communication server 90, terminal apparatus 300b, and program processing apparatus 200b. For example, user B performs, on terminal apparatus 300b, the user operation similar to the above-described user operation performed by user A on terminal apparatus 300a, whereby user B can view the broadcast program specified by user B on a display of terminal apparatus 300b from among broadcast programs recorded in program processing apparatus 200b.

Figure 2:
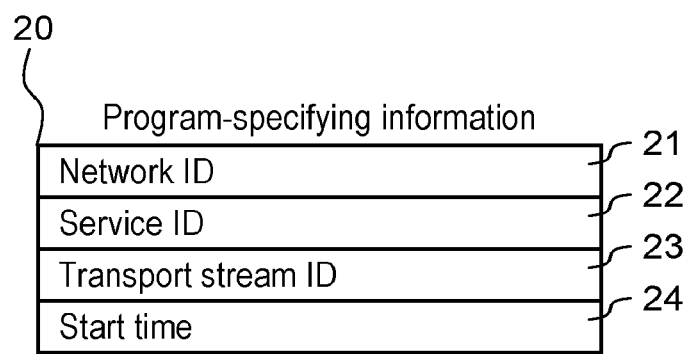
FIG. 2 is a diagram schematically illustrating one configuration example of program-specifying information according to the first exemplary embodiment.

It is to be noted that the above-described program-specifying information has, for example, a configuration illustrated in FIG. 2. FIG. 2 is a diagram schematically illustrating one configuration example of program-specifying information 20 according to the first exemplary embodiment.

As illustrated in FIG. 2, program-specifying information 20 includes network identification (ID) 21, service ID 22, transport stream ID 23, and start time 24.

Network ID 21 is information for identifying a network to which a broadcasting station (not illustrated) that broadcasts the broadcast program belongs (for example, terrestrial broadcasting, satellite broadcasting, or the like). Service ID 22 is information for identifying a broadcast service that broadcasts the broadcast program (for example, a broadcasting station). Transport stream ID 23 is information for identifying a moving picture experts group (MPEG) 2 transport stream of the broadcast program broadcasted by the broadcasting station. Start time 24 is information that indicates date and time of broadcast start of the broadcast program. Program processing apparatus 200 is configured to be capable of extracting and acquiring network ID 21, service ID 22, transport stream ID 23, and start time 24 from service information (SI) included in broadcast waves.

Next, each apparatus included in information processing system 10 will be described.

Figure 3:
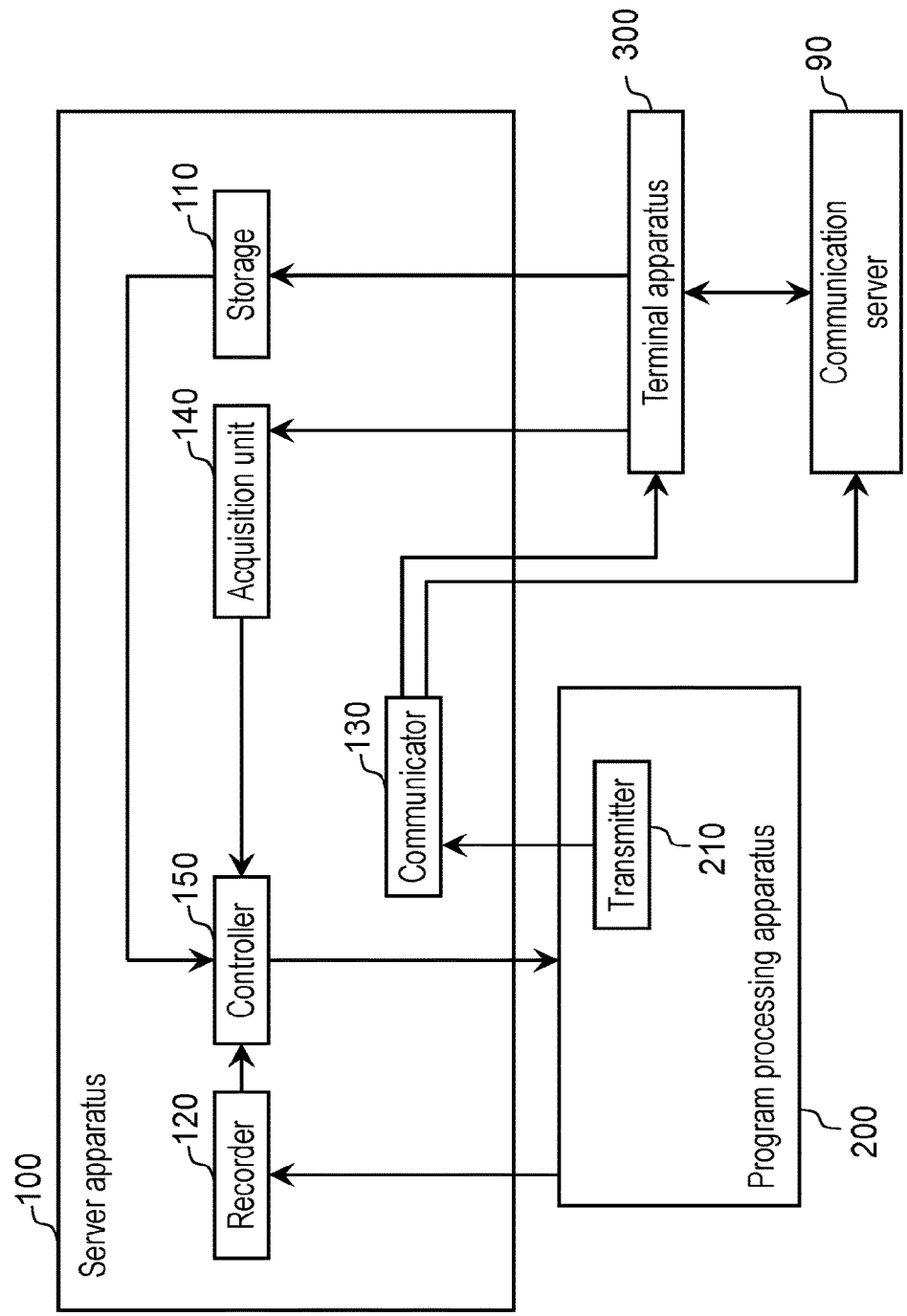
FIG. 3 is a block diagram schematically illustrating one example of a functional configuration of a server apparatus included in the information processing system according to the first exemplary embodiment.

FIG. 3 is a block diagram schematically illustrating one example of a functional configuration of server apparatus 100 included in information processing system 10 according to the first exemplary embodiment. It is to be noted that FIG. 3 illustrates program processing apparatus 200, terminal apparatus 300, and communication server 90 together.

Server apparatus 100 includes storage 110, recorder 120, communicator 130, acquisition unit 140, and controller 150, as illustrated in FIG. 3.

Storage 110 stores association information 30 (illustrated in FIG. 4) for each user registered in server apparatus 100. Association information 30 will be described below with reference to FIG. 4. It is to be noted that storage 110 may be a semiconductor memory or may be a storage device such as a hard disk drive.

FIG. 4 is a diagram schematically illustrating one configuration example of association information 30 according to the first exemplary embodiment.

As illustrated as one example in FIG. 4, association information 30 is, for each user registered in server apparatus 100, information that associates user identification information 31 on the user with access information 32 on program processing apparatus 200 used by the user.

User identification information 31 is information for identifying the user, and for example, is a login ID for logging in to server apparatus 100 assigned to each user. It is to be noted that user identification information 31 is not limited to the login ID at all, and may be any other information that allows identification of users registered in server apparatus 100 from each other.

Access information 32 on program processing apparatus 200 is information unique to program processing apparatus 200, and is information for specifying and accessing program processing apparatus 200. Access information 32 is, for example, an ID of program processing apparatus 200. It is to be noted that access information 32 is not limited to the ID of program processing apparatus 200 at all, and may be any other information that allows specification of and access to program processing apparatus 200. Access information 32 may be, for example, a global Internet Protocol (IP) address of program processing apparatus 200, or the like.

FIG. 4 illustrates association information 30 on user A and user B as one example. In the example illustrated in FIG. 4, the login ID "A0123" of user A is registered as user identification information 31 on user A, whereas the login ID "B0321" of user B is registered as user identification information 31 on user B. In addition, ID "01010" of program processing apparatus 200a is registered as access information 32 on program processing apparatus 200a used by user A, whereas ID "01012" of program processing apparatus 200b is registered as access information 32 on program processing apparatus 200b used by user B. Login ID "A0123" of user A and ID "01010" of program processing apparatus 200a are associated with each other, whereas login ID "B0321" of user B and ID "01012" of program processing apparatus 200b are associated with each other. It is to be noted that server apparatus 100 may hold association information 30 as part of account information on each user who uses server apparatus 100.

Recorder 120 records recording information 40 (illustrated in FIG. 5) for each program processing apparatus 200 registered in server apparatus 100. Recording information 40 will be described below with reference to FIG. 5. It is to be noted that recorder 120 may be a semiconductor memory or may be a storage device such as a hard disk drive.

FIG. 5 is a diagram schematically illustrating one configuration example of recording information 40 according to the first exemplary embodiment.

As illustrated as one example in FIG. 5, for each program processing apparatus 200 registered in server apparatus 100, recording information 40 is information that associates ID 41 of program processing apparatus 200, information indicating a recording area of the broadcast program (hereinafter also referred to as "content") recorded in program processing apparatus 200 (hereinafter the information is referred to as "recorded content location information 42"), and program-specifying information 20 for specifying the broadcast program with one another. It is to be noted that ID 41 of program processing apparatus 200 is information identical to the information (ID) registered as access information 32 on program processing apparatus 200 in association information 30 illustrated in FIG. 4. In addition, program-specifying information 20 illustrated in FIG. 5 is information having structure identical to structure of program-specifying information 20 illustrated in FIG. 2.

Recorded content location information 42 is information for identifying the area in which the broadcast program specified by program-specifying information 20 is recorded in program processing apparatus 200 identified by ID 41, and is, for example, a recorded content ID assigned by program processing apparatus 200. When the broadcast program is recorded, program processing apparatus 200 transmits program-specifying information 20 of the broadcast program and recorded content location information 42 that indicates the area in which the broadcast program is recorded to server apparatus 100 together with ID 41 of program processing apparatus 200. Server apparatus 100 can recognize from which program processing apparatus 200 the information has been transmitted by receiving ID 41 transmitted from program processing apparatus 200. Every time server apparatus 100 receives these pieces of information, server apparatus 100 updates recording information 40.

FIG. 5 illustrates recording information 40 on program processing apparatus 200a and program processing apparatus 200b as one example. In the example illustrated in FIG. 5, in recording information 40, "01010" is registered as ID 41 of program processing apparatus 200a, recorded content ID "00005" is registered as recorded content location information 42, and "001002003" is registered as program-specifying information 20. Also, these pieces of information are associated with one another. It is to be noted that "001002003" of program-specifying information 20 indicates that network ID 21 is "001", service ID 22 is "002", and transport stream ID 23 is "003". It is to be noted that information that indicates start time 24 follows these pieces of information, but this information is omitted in FIG. 5. The example illustrated in FIG. 5 indicates that the broadcast program specified by program-specifying information 20 "001002003" is recorded in the area specified by recorded content location information 42 "00005" of program processing apparatus 200a specified by ID 41 "01010". It is to be noted that description regarding recording information 40 on program processing apparatus 200b specified by ID 41 "01012" is omitted because of overlap.

After performing processing such as recording reservation or recording of the broadcast program, program processing apparatus 200 generates program-specifying information 20, and then transmits generated program-specifying information 20 from transmitter 210 to server apparatus 100. On receipt of program-specifying information 20 transmitted from program processing apparatus 200, communicator 130 of server apparatus 100 adds additional information for accessing server apparatus 100 to program-specifying information 20 to generate notification information 50 (illustrated in FIG. 6). Then, communicator 130 transmits notification information 50 to terminal apparatus 300 directly or via communication server 90. Notification information 50 will be described below with reference to FIG. 6. It is to be noted that communicator 130 may include a communication interface and a processor that executes a control program stored in a memory. In addition, this control program may include a program for performing report processing to be described later. In addition, transmitter 210 of program processing apparatus 200 may include a communication interface and a processor that executes a control program stored in a memory.

Figure 6:
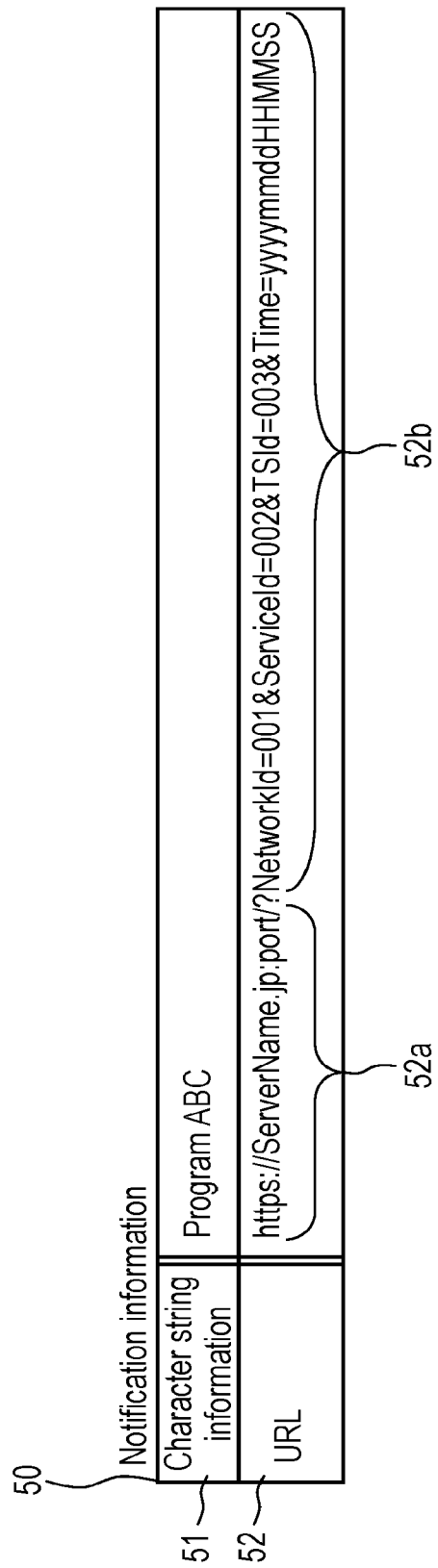
FIG. 6 is a diagram schematically illustrating one configuration example of notification information according to the first exemplary embodiment.

FIG. 6 is a diagram schematically illustrating one configuration example of notification information 50 according to the first exemplary embodiment.

As illustrated as one example in FIG. 6, notification information 50 is information including character string information 51 and uniform resource locator (URL) 52. Character string information 51 is a character string related to a broadcast program, for example, a program name of the broadcast program or the like. URL 52 is information for identifying a place of server apparatus 100 (uniform resource identifier (URI)) on line network 11 (for example, the Internet). URL 52 includes additional information 52a for accessing server apparatus 100 and program-specifying information 52b that indicates the broadcast program. Additional information 52a is information for accessing server apparatus 100 with a host name, a domain name, and a port number of server apparatus 100 as a Web server described in hyper text transfer protocol (HTTP). Here, HTTP with security secured by secure sockets layer (SSL) may be used as one example. In addition, in the example illustrated in FIG. 6, program-specifying information 52b indicates that network ID 21 is "001", service ID 22 is "002", transport stream ID 23 is "003", and start time 24 of the broadcast program is "yyyymmddHHMMSS". Start time 24 is information representing year (yyyy), month (mm), date (dd), hour (HH), minute (MM), and second (SS) when broadcast of the broadcast program is started for allowing specification of the broadcast program.

When the user operates terminal apparatus 300 to access server apparatus 100 in order to use a service related to the broadcast program, terminal apparatus 300 transmits information including user identification information 31 on the user (for example, login ID or the like), program-specifying information 20 that indicates the broadcast program specified by the user, processing information specified by the user, and the like to server apparatus 100. The processing information is information that indicates processing the user desires to cause program processing apparatus 200 to perform (for example, recording reservation, recording, playback, or the like). Acquisition unit 140 of server apparatus 100 receives and acquires user identification information 31, program-specifying information 20, and the processing information transmitted from terminal apparatus 300. It is to be noted that acquisition unit 140 may include a communication interface and a processor that executes a control program stored in a memory.

When the user logs in to server apparatus 100 from terminal apparatus 300 and acquisition unit 140 acquires user identification information 31 (for example, login ID), program-specifying information 20, and the processing information transmitted from terminal apparatus 300, controller 150 specifies access information 32 corresponding to user identification information 31, based on association information 30 stored in storage 110 and user identification information 31 acquired by acquisition unit 140. Then, controller 150 controls program processing apparatus 200 corresponding to access information 32 so that program processing apparatus 200 performs processing based on program-specifying information 20 and the processing information acquired by acquisition unit 140.

In addition, in order to check with the user whether to cause program processing apparatus 200 to perform processing, or in order to indicate to the user choices of processing to cause program processing apparatus 200 to perform, controller 150 may transmit processing candidate information 60 (illustrated in FIG. 7) to terminal apparatus 300. Processing candidate information 60 will be described below with reference to FIG. 7. It is to be noted that controller 150 may include a communication interface, a processor that executes a control program stored in a memory, and a timekeeping mechanism for obtaining current time.

Figure 7:
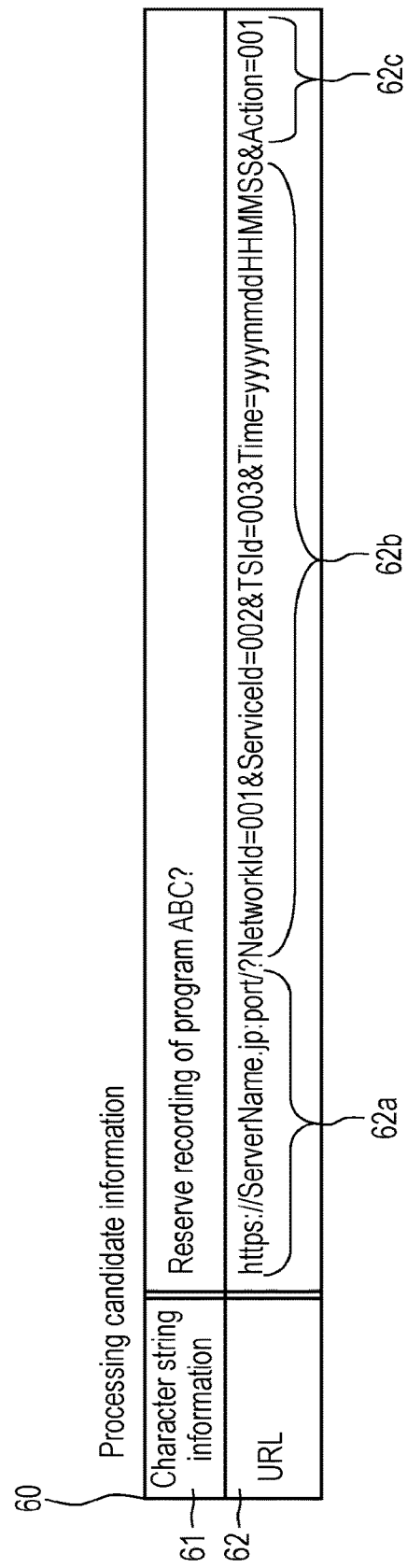
FIG. 7 is a diagram schematically illustrating one configuration example of processing candidate information according to the first exemplary embodiment.

FIG. 7 is a diagram schematically illustrating one configuration example of processing candidate information 60 according to the first exemplary embodiment.

As illustrated as one example in FIG. 7, processing candidate information 60 is information including character string information 61 and URL 62. Character string information 61 is, for example, a character string that represents how to process the broadcast program. URL 62 is information including additional information 62a, program-specifying information 62b, and processing information 62c that indicates processing to be performed by program processing apparatus 200. Additional information 62a and program-specifying information 62b are pieces of information similar to additional information 52a and program-specifying information 52b included in URL 52 illustrated in FIG. 6. It is to be noted that details of an operation to be performed when controller 150 determines processing to cause program processing apparatus 200 to perform will be described later. In addition, controller 150 and acquisition unit 140 perform control processing to be described later by the control program.

It is to be noted that server apparatus 100 may be configured to receive an electronic program guide (EPG) via the communication interface and line network 11 (for example, the Internet). The EPG is information including a broadcasting schedule and program name of the broadcast program, and other information. In addition, server apparatus 100 may include a broadcast receiving circuit and may be configured to receive the EPG from broadcast waves. It is to be noted that this EPG preferably includes information regarding the broadcast program which program processing apparatus 200 registered in server apparatus 100 can receive.

It is to be noted that transmitter 210 of program processing apparatus 200 may be configured to transmit program-specifying information 20 to server apparatus 100 under a preset condition. Program processing apparatus 200 may be configured so that the user may set the condition at his/her option for transmitting program-specifying information 20 to server apparatus 100.

Examples of this condition may include a case where program processing apparatus 200 performs recording reservation or recording of the broadcast program including a keyword previously registered by the user in program processing apparatus 200 (for example, the broadcast program with the keyword included in the program name thereof), or a case where program processing apparatus 200 performs recording reservation or recording of the broadcast program of a category previously registered by the user in program processing apparatus 200 (for example, news, sports, or the like).

In a case where program processing apparatus 200 is configured in this way, when terminal apparatus 300 acquires notification information 50 from server apparatus 100, the user can know, for example, that the broadcast program of the previously registered category is recorded in program processing apparatus 200.

It is to be noted that in a case where program processing apparatus 200 is configured to successively record a plurality of programs that are broadcasted (for example, all programs), it is useful for the user that the user can know that the broadcast program of the specific category is recorded by program processing apparatus 200.

[1-2. Operation]

Next, an operation of information processing system 10 will be described. First, report processing to be performed by server apparatus 100 will be described.

[1-2-1. Report Processing of Server Apparatus]

In the following description, it is assumed that program processing apparatus 200 is configured to transmit program-specifying information 20, which indicates the broadcast program, from transmitter 210 to server apparatus 100 under a predetermined condition when performing processing such as recording reservation or recording of the broadcast program.

On receipt of program-specifying information 20 from program processing apparatus 200, server apparatus 100 performs report processing. The report processing refers to processing for reporting the user who uses program processing apparatus 200 that processing related to the broadcast program is performed by transmitting notification information 50 to terminal apparatus 300.

Figure 8:
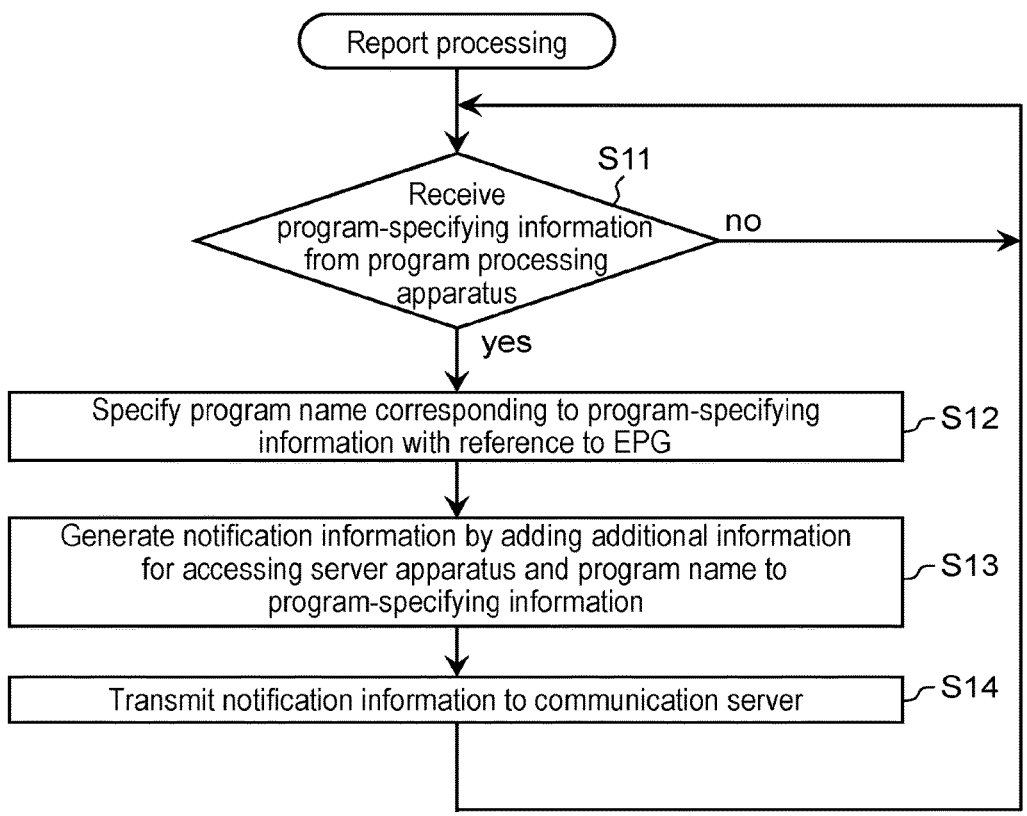
FIG. 8 is a flowchart illustrating one example of report processing to be performed by the server apparatus according to the first exemplary embodiment.

FIG. 8 is a flowchart illustrating one example of the report processing to be performed by server apparatus 100 according to the first exemplary embodiment.

Communicator 130 of server apparatus 100 waits for transmission of program-specifying information 20 from program processing apparatus 200 (step S11).

On receipt of program-specifying information 20 (Yes in step S11), communicator 130 specifies the program name of the broadcast program corresponding to program-specifying information 20 with reference to the EPG (step S12).

Next, communicator 130 generates notification information 50 (refer to FIG. 6) by adding additional information for accessing server apparatus 100 and information that indicates the program name specified in step S12 to program-specifying information 20 received in step S11 (step S13). For example, when program processing apparatus 200 performs recording reservation or recording of the broadcast program with the program name "program ABC" and transmits program-specifying information 20 from transmitter 210 to server apparatus 100, notification information 50 to be generated in step S13 will have, for example, content illustrated in FIG. 6.

Next, communicator 130 transmits generated notification information 50 to communication server 90 (step S14).

After execution of step S14, controller 150 returns processing to step S11.

It is to be noted that server apparatus 100 may, for example, for each user registered in advance, hold account information that associates ID 41 of program processing apparatus 200 with a destination for transmitting a message to the user (for example, email address, or the like). Then, in step S14, based on this account information, communicator 130 may designate that notification information 50 be transmitted to the user to whom notification information 50 is to be transmitted (that is, the user associated with program processing apparatus 200 that has transmitted program-specifying information 20), and may transmit notification information 50 to communication server 90.

Alternatively, in step S14, communicator 130 may directly transmit notification information 50 to the email address of the user to whom notification information 50 is to be transmitted without via communication server 90.

It is to be noted that notification information 50 may be transferred by the user who receives notification information 50 to other users. Alternatively, notification information 50 may be shared via communication server 90 with users other than the user to whom notification information 50 is to be transmitted. Therefore, server apparatus 100 may be accessed from terminal apparatuses 300 of a plurality of users based on notification information 50 that is spread in this way.

Next, control processing to be performed by server apparatus 100 will be described.

[1-2-2. Control Processing of Server Apparatus]

On receipt of program-specifying information 20 from terminal apparatus 300, server apparatus 100 performs control processing in order to control program processing apparatus 200 associated with user identification information 31 of the user who uses terminal apparatus 300.

Figure 9:
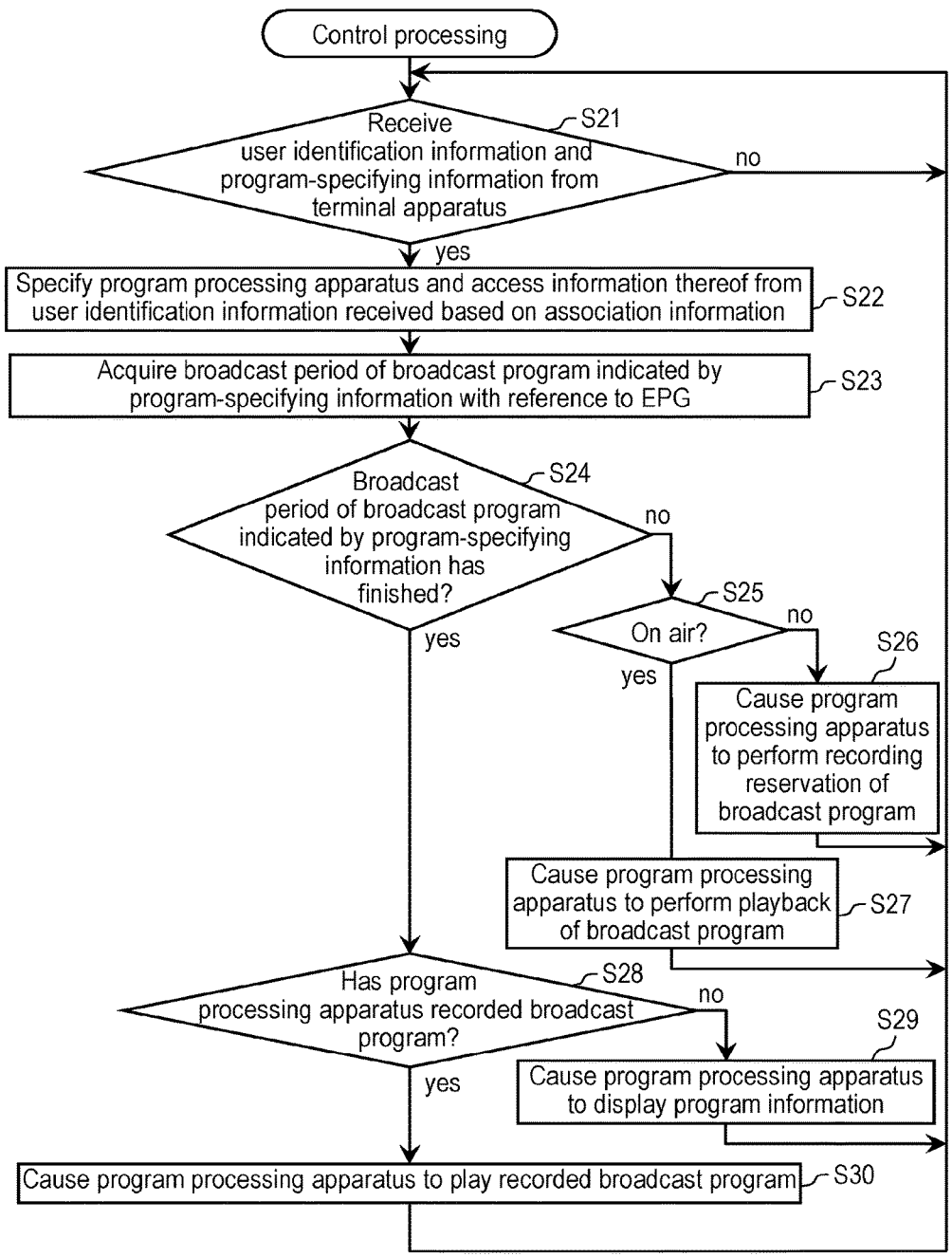
FIG. 9 is a flowchart illustrating one example of control processing to be performed by the server apparatus according to the first exemplary embodiment.

FIG. 9 is a flowchart illustrating one example of the control processing to be performed by server apparatus 100 according to the first exemplary embodiment.

Acquisition unit 140 of server apparatus 100 waits for transmission of user identification information 31 and program-specifying information 20 from terminal apparatus 300 (step S21).

On receipt and acquisition of user identification information 31 and program-specifying information 20 (Yes in step S21), acquisition unit 140 conveys acquired user identification information 31 and program-specifying information 20 to controller 150.

It is to be noted that in step S21, acquisition unit 140 does not necessarily need to simultaneously receive user identification information 31 and program-specifying information 20. For example, when terminal apparatus 300 receives notification information 50 illustrated in FIG. 6 as one example, character string information 51 included in notification information 50 is displayed on a display of terminal apparatus 300, and the user performs a selection operation based on this display on terminal apparatus 300, then terminal apparatus 300 accesses server apparatus 100 based on URL 52 included in notification information 50. At this time, server apparatus 100 receives program-specifying information 20 from terminal apparatus 300 in response to the access. In this case, after receiving program-specifying information 20, server apparatus 100 requests terminal apparatus 300 for the login ID, and receives user identification information 31 transmitted from terminal apparatus 300 in response to the request. Therefore, in such a case, acquisition unit 140 receives program-specifying information 20 and user identification information 31 at an interval therebetween. Such an operation is also allowed in step S21.

On receipt of user identification information 31 and program-specifying information 20 from acquisition unit 140, controller 150 specifies access information 32 of program processing apparatus 200 corresponding to user identification information 31 on the basis of association information 30 stored in storage 110 and user identification information 31 (step S22).

Next, with reference to the EPG, controller 150 acquires, from the EPG, information regarding a broadcast period of the broadcast program indicated by program-specifying information 20 received from acquisition unit 140 (step S23).

Next, in step S24 to step S30, regarding the broadcast program indicated by program-specifying information 20 received from acquisition unit 140, controller 150 determines what kind of processing to cause program processing apparatus 200 corresponding to user identification information 31 received from acquisition unit 140 to perform. Based on the determination, controller 150 controls program processing apparatus 200.

First, controller 150 determines whether the broadcast period of the broadcast program indicated by program-specifying information 20 has finished (step S24).

Specifically, in step S24, controller 150 compares the information regarding the broadcast period acquired in step S23 with the current time. The information regarding the broadcast period includes at least one of a start time and a finish time of the broadcast program. For example, if the current time exceeds the finish time of the broadcast program, controller 150 determines that the broadcast period of the broadcast program has already finished (Yes in step S24).

On determination in step S24 that the broadcast period of the broadcast program has not finished (No in step S24), controller 150 determines whether the broadcast program is on air (step S25).

Controller 150 compares the current time with the start time of the broadcast program in step S25. If the current time is before the start time of the broadcast program, controller 150 determines that the broadcast program is not on air (No in step S25).

On determination in step S25 that the broadcast program is not on air (No in step S25), controller 150 accesses program processing apparatus 200 corresponding to access information 32 on the basis of access information 32 specified in step S22, and then controller 150 controls program processing apparatus 200 so that program processing apparatus 200 performs recording reservation of the broadcast program (step S26).

Specifically, in step S26, controller 150 transmits a predetermined instruction (command) for recording reservation together with program-specifying information 20 acquired in step S21 to program processing apparatus 200 corresponding to access information 32 specified in step S22. On receipt of the instruction for recording reservation and program-specifying information 20, program processing apparatus 200 performs scheduling of recording so that the broadcast program specified by program-specifying information 20 may be recorded when broadcasting of the broadcast program starts.

It is to be noted that before performing processing of step S26, in order to check with the user whether to cause program processing apparatus 200 to perform recording reservation, controller 150 may transmit processing candidate information 60 illustrated as one example in FIG. 7 to terminal apparatus 300. In this case, based on received processing candidate information 60, terminal apparatus 300 displays, on a display, the choices for checking with the user whether to perform recording reservation, and then waits for the selection operation of the user. In a case where the user performs the selection operation of performing recording reservation, terminal apparatus 300 transmits the processing information to server apparatus 100 based on URL 62 included in processing candidate information 60. Here, it is assumed that the processing information refers to information that indicates one type of processing selected by the user from the choices based on processing candidate information 60. Based on the processing information received by acquisition unit 140, controller 150 of server apparatus 100 controls program processing apparatus 200 (for example, instruct to perform recording reservation). When the user performs an operation of selecting suspension of recording reservation, terminal apparatus 300 may finish processing.

After execution of step S26, controller 150 returns processing to step S21.

Controller 150 compares the current time with the start time of the broadcast program in step S25. When the current time exceeds the start time of the broadcast program, controller 150 determines that the broadcast program is on air (Yes in step S25).

On determination in step S25 that the broadcast program is on air (Yes in step S25), controller 150 accesses program processing apparatus 200 corresponding to access information 32 on the basis of access information 32 specified in step S22. Controller 150 then controls program processing apparatus 200 so that program processing apparatus 200 performs playback of the broadcast program and, for example, the broadcast program is displayed on a display of terminal apparatus 300 corresponding to user identification information 31 (or an audio is output from a speaker of terminal apparatus 300) (step S27). It is to be noted that controller 150 may determine that, for example, a period from the start time to the finish time of the broadcast program is the broadcast period, and when the current time is included in the broadcast period, controller 150 may determine that the broadcast program is on air.

In step S27, controller 150 transmits a predetermined playback instruction (command) together with program-specifying information 20 acquired in step S21 to program processing apparatus 200 corresponding to access information 32 specified in step S22. On receipt of the playback instruction and program-specifying information 20, program processing apparatus 200 receives and plays the broadcast program specified by program-specifying information 20.

Reception and playback of this broadcast program are playback of an audio, for example, when the broadcast program is an audio program. When the broadcast program is a video program, reception and playback of this broadcast program are playback of a video. When the broadcast program is a program including a video and audio, reception and playback of this broadcast program are playback of a video and audio. In addition, this playback may be displaying a video on a display included in program processing apparatus 200, or may be outputting an audio from a speaker included in program processing apparatus 200. In addition, this playback may be sending out data (or a signal) representing the video or audio of the broadcast program to another apparatus (for example, terminal apparatus 300 corresponding to user identification information 31) so that the apparatus displays the video or outputs the audio of the broadcast program. It is to be noted that this playback does not refer to playing the broadcast program recorded in program processing apparatus 200, but refers to receiving and playing a broadcasted signal on a real-time basis by program processing apparatus 200.

After execution of step S27, controller 150 returns processing to step S21.

On determination in step S24 that the broadcast period of the broadcast program indicated by program-specifying information 20 has finished (Yes in step S24), controller 150 determines whether program processing apparatus 200 corresponding to user identification information 31 acquired in step S21 has recorded the broadcast program (step S28).

Controller 150 performs the determination of step S28 based on recording information 40 recorded in recorder 120. Recording information 40 is updated by recorder 120 so that, every time program processing apparatus 200 records the broadcast program, a state of the recording may be reflected. When program processing apparatus 200 has recorded the broadcast program, the recording area of the broadcast program in program processing apparatus 200 is specified by recording information 40.

On determination in step S28 that program processing apparatus 200 has not recorded the broadcast program indicated by program-specifying information 20 (No in step S28), controller 150 accesses program processing apparatus 200 corresponding to access information 32 on the basis of access information 32 specified in step S22. Controller 150 then controls program processing apparatus 200 so that program processing apparatus 200 may display the program information on the broadcast program, and for example, so that terminal apparatus 300 corresponding to user identification information 31 may display the program information (step S29).

This program information on the broadcast program refers to, for example, when the broadcast program is one of series programs that continue over multiple times, information that indicates the broadcast start time, cast members, and the like of the broadcast program of the next time (hereinafter referred to as "next program"). It is to be noted that controller 150 may transmit processing candidate information 60 to terminal apparatus 300 corresponding to user identification information 31 so that the user may select that program processing apparatus 200 performs recording reservation of the next program. Processing candidate information 60 in this case may be, for example, character string information of "recording reservation of next program ABC" and additional information 62a and processing information 62c added to program-specifying information 20 that specifies the next program.

It is to be noted that when controller 150 controls program processing apparatus 200 in step S29 to transmit the program information to terminal apparatus 300 corresponding to user identification information 31, terminal apparatus 300 displays, on a display, a video based on the program information received from program processing apparatus 200.

After execution of step S29, controller 150 returns processing to step S21.

On determination in step S28 that program processing apparatus 200 has recorded the broadcast program indicated by program-specifying information 20 (Yes in step S28), controller 150 accesses program processing apparatus 200 corresponding to access information 32 on the basis of access information 32 specified in step S22. Controller 150 then controls program processing apparatus 200 so that program processing apparatus 200 may perform playback of the recorded broadcast program (hereinafter referred to as "recorded program"), and for example, so that the recorded program may be displayed on a display of terminal apparatus 300 corresponding to user identification information 31 (or so that an audio is output from a speaker of terminal apparatus 300) (step S30).

Specifically in step S30, controller 150 transmits recorded content location information 42 included in recording information 40 used for the determination of step S28 and the predetermined recorded program playback instruction (command) to program processing apparatus 200 corresponding to access information 32 specified in step S22. On receipt of the recorded program playback instruction and recorded content location information 42, program processing apparatus 200 plays the recorded program recorded in the area indicated by recorded content location information 42.

It is to be noted that in a case where recorded content location information 42 is transmitted from server apparatus 100, program processing apparatus 200 can start playback of the recorded program more quickly than in a case where only program-specifying information 20 is transmitted from server apparatus 100.

For example, when the recorded program is an audio program, playback of this recorded program is playback of the audio. When the recorded program is a video program, playback of this recorded program is playback of the video. When the recorded program is a program including a video and audio, playback of this recorded program is playback of the video and audio. In addition, playback of this recorded program may be displaying a video on a display included in program processing apparatus 200, or may be outputting an audio from a speaker included in program processing apparatus 200. In addition, playback of this recorded program may be sending out data (or a signal) representing the video or audio of the recorded program to another apparatus (for example, terminal apparatus 300 corresponding to user identification information 31) so that the apparatus displays the video or outputs the audio of the recorded program.

It is to be noted that controller 150 may allow the user to select whether to cause the playback video (or playback audio) of the recorded program to be displayed on a display (or to be output from a speaker) included in program processing apparatus 200, or to cause the playback audio (or playback audio) of the recorded program to be displayed on a display (or to be output from a speaker) included in another apparatus. For this purpose, controller 150 may transmit, to terminal apparatus 300, processing candidate information 60 including information indicating the choices (for example, processing candidate information 60 including information for allowing selection of direct playback or playback by another apparatus). Then, controller 150 may receive, from terminal apparatus 300, an instruction according to the selection operation of the user who operates terminal apparatus 300, and may then transmit the instruction to program processing apparatus 200. It is to be noted that when controller 150 controls program processing apparatus 200 in step S30 to transmit playback data (or playback signal) of the recorded program to terminal apparatus 300 corresponding to user identification information 31, terminal apparatus 300 displays a video on a display (or outputs an audio from a speaker) based on the playback data (or playback signal) received from program processing apparatus 200.

After execution of step S30, controller 150 returns processing to step S21.

Next, a communication sequence to be performed between respective apparatuses in information processing system 10 will be described.

[1-2-3. Playback of Recorded Program]

First, the communication sequence of remote control and playback of the recorded program recorded in program processing apparatus 200 from terminal apparatus 300 will be described.

Figure 10:
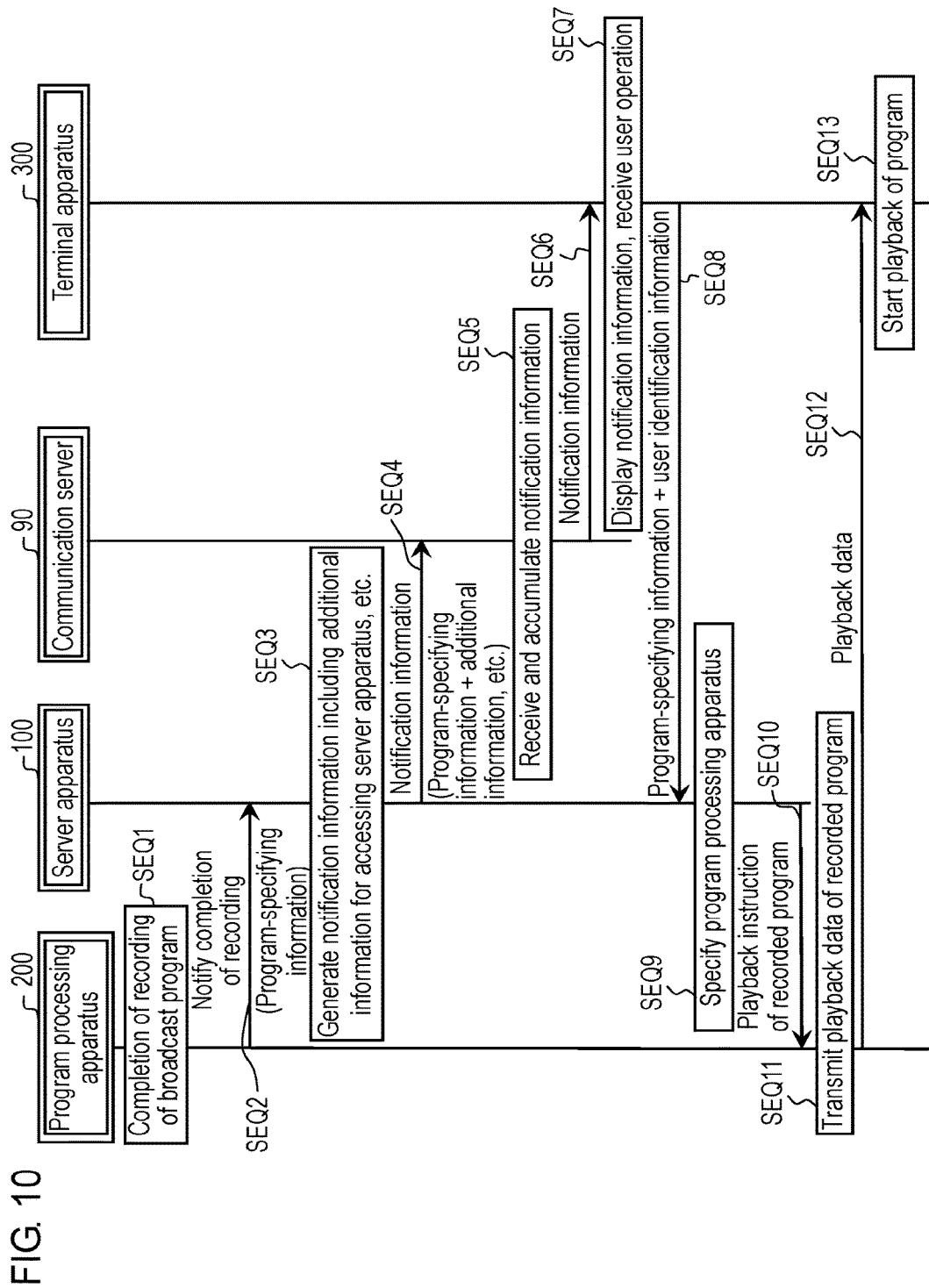
FIG. 10 is a sequence diagram illustrating an operational example related to playback of a recorded program to be performed by the information processing system according to the first exemplary embodiment.

FIG. 10 is a sequence diagram illustrating an operational example related to playback of the recorded program to be performed by information processing system 10 according to the first exemplary embodiment.

First, program processing apparatus 200 installed in a home (for example, program processing apparatus 200a) receives the broadcast program and completes recording of the broadcast program (sequence SEQ 1).

Hereinafter, the broadcast program recorded in program processing apparatus 200 is assumed to be a broadcast program that includes in the program name the keyword registered by the user (for example, user A) in program processing apparatus 200 in advance. In addition, the program name of this broadcast program is assumed to be "program ABC".

Program processing apparatus 200 that has completed recording of the broadcast program (for example, program ABC) transmits, to server apparatus 100, a notification of the completion of recording including program-specifying information 20 (refer to FIG. 2) that specifies the broadcast program (sequence SEQ 2).

In addition, when recording of the broadcast program is completed, in addition to the notification of the completion of recording, program processing apparatus 200 transmits recorded content location information 42 that indicates the recording area of the broadcast program (for example, program ABC) and ID 41 of program processing apparatus 200 to server apparatus 100. The information transmission is also performed from other program processing apparatuses 200 (for example, program processing apparatus 200*b*) every time the broadcast program is recorded. Server apparatus 100 updates recording information 40 (refer to FIG. 5) recorded in recorder 120 by using received recorded content location information 42 and ID 41.

On receipt of the notification of the completion of recording transmitted from program processing apparatus 200, server apparatus 100 adds additional information for accessing server apparatus 100 to program-specifying information 20 included in the notification of the completion of recording, and then generates notification information 50 (refer to FIG. 6) (sequence SEQ 3).

Server apparatus 100 transmits notification information 50 generated in sequence SEQ 3 to communication server 90 (sequence SEQ 4).

On receipt of notification information 50 transmitted from server apparatus 100, communication server 90 accumulates notification information 50 in a storage medium (not illustrated) included in communication server 90 (sequence SEQ 5).

Communication server 90 transmits notification information 50 received in sequence SEQ 5 to terminal apparatus 300 (for example, terminal apparatus 300*a*) of the user associated with program processing apparatus 200 that has transmitted the notification of the completion of recording in sequence SEQ 2 (sequence SEQ 6).

It is to be noted that server apparatus 100 designates communication server 90 as a transmission destination of notification information 50 as follows, for example. Server apparatus 100 determines the transmission destination of notification information 50 (for example, user A) based on information that specifies program processing apparatus 200 that has transmitted the notification of the completion of recording (for example, ID 41 of program processing apparatus 200*a*), and the account information registered in server apparatus 100. Then, server apparatus 100 transmits information on the transmission destination (for example, information that designates user A) together with notification information 50 to communication server 90. This allows communication server 90 to recognize the transmission destination of notification information 50 received from server apparatus 100. For example, when user A accesses communication server 90 by using terminal apparatus 300*a*, communication server 90 recognizes that user A has accessed communication server 90, and then checks whether communication server 90 holds information that should be transmitted to user A. When communication server 90 holds notification information 50 with user A designated as the transmission destination, communication server 90 transmits notification information 50 to terminal apparatus 300*a*.

It is to be noted that communication server 90 may operate so as to avoid duplicate transmission of notification information 50 that has once been transmitted.

On receipt of notification information 50 from communication server 90, terminal apparatus 300 displays information based on notification information 50 (for example, the character string that indicates the program name, or the like) on a display of terminal apparatus 300. Then, terminal apparatus 300 receives the user operation based on the information displayed on the display (sequence SEQ 7).

When the user looks at the information displayed on the display of terminal apparatus 300 (for example, the character string of "program ABC", hyperlink display, and the like) and then performs the user operation of selecting the hyperlink in order to view the broadcast program, terminal apparatus 300 receives the user operation. On receipt of the user operation, terminal apparatus 300 accesses server apparatus 100 by using URL 52 (refer to FIG. 6) included in notification information 50, and then transmits program-specifying information 20 and user identification information 31 (for example, the login ID of the user, or the like) to server apparatus 100 (sequence SEQ 8).

It is to be noted that in sequence SEQ 8, server apparatus 100 that is accessed from terminal apparatus 300 may request user identification information 31 from terminal apparatus 300. In response to the request, terminal apparatus 300 may transmit user identification information 31 to server apparatus 100.

It is to be noted that, for example, when the login ID is used as user identification information 31 and a state where terminal apparatus 300 has logged in to server apparatus 100 continues from before execution of sequence SEQ 8, the login ID of the user has already been transmitted from terminal apparatus 300 to server apparatus 100, and thus terminal apparatus 300 may omit transmission of user identification information 31 in sequence SEQ 8.

Server apparatus 100 specifies program processing apparatus 200 (for example, program processing apparatus 200*a*) to which the instruction is to be issued based on user identification information 31 received in sequence SEQ 8 and association information 30 held in server apparatus 100 (refer to FIG. 4). Server apparatus 100 then specifies access information 32 for program processing apparatus 200 (sequence SEQ 9).

Based on access information 32 specified in sequence SEQ 9 and program-specifying information 20 received in sequence SEQ 8, server apparatus 100 transmits the instruction to perform playback of the recorded program (for example, program ABC) corresponding to program-specifying information 20 (hereinafter the instruction is referred to as "playback instruction") to program processing apparatus 200 corresponding to access information 32 (sequence SEQ 10).

In sequence SEQ 10, server apparatus 100 transmits recorded content location information 42 corresponding to received program-specifying information 20 and the playback instruction of the recorded program to program processing apparatus 200. It is to be noted that information that specifies a position of terminal apparatus 300 that accesses server apparatus 100 in sequence SEQ 8 on line network 11 (for example, the Internet) (hereinafter the information is referred to as "address information") is assumed to be added to the playback instruction transmitted from server apparatus 100. This allows program processing apparatus 200 that receives the playback instruction to recognize the transmission destination of the playback data of the recorded program. It is to be noted that this address information, which is for example an IP address, may be other information.

Program processing apparatus 200 that receives the playback instruction and recorded content location information 42 specifies the recorded program (for example, program ABC) based on received recorded content location information 42. Program processing apparatus 200 then transmits the playback data of the recorded program (for example, video data or audio data necessary for playback of program ABC) to terminal apparatus 300 designated by the address information (sequence SEQ 11, sequence SEQ 12).

Terminal apparatus 300 that receives the playback data starts playback of the recorded program (for example, program ABC) based on the received playback data (sequence SEQ 13). This allows the user who uses terminal apparatus 300 to view the broadcast program (for example, program ABC) through a display or speaker of terminal apparatus 300.

Thus, information processing system 10 described in the present exemplary embodiment allows the user who uses terminal apparatus 300 to know information on the broadcast program recorded in program processing apparatus 200 through terminal apparatus 300 by a relatively simple operation. In addition, the user who uses terminal apparatus 300 can perform remote control of program processing apparatus 200 from terminal apparatus 300 by a relatively simple operation, play the broadcast program recorded in program processing apparatus 200, and view the broadcast program on terminal apparatus 300.

[1-2-4. Playback of Recorded Program by User Cooperation]

Next, the following describes the communication sequence in a case where information processing system 10 includes multiple program processing apparatuses 200 and terminal apparatuses 300 and where multiple users cooperate with each other, perform remote control of program processing apparatus 200, and play the recorded program.

The following describes the communication sequence in the case where information processing system 10 includes program processing apparatus 200*a* and terminal apparatus 300*a* used by user A, and program processing apparatus 200*b* and terminal apparatus 300*b* used by user B, where notification information 50 is transferred from user A to user B, and where user B performs remote control to instruct playback of the recorded program from terminal apparatus 300*b* on program processing apparatus 200*b*.

It is to be noted that information processing system 10 may include three or more program processing apparatuses 200 and three or more terminal apparatuses 300.

Figure 11:
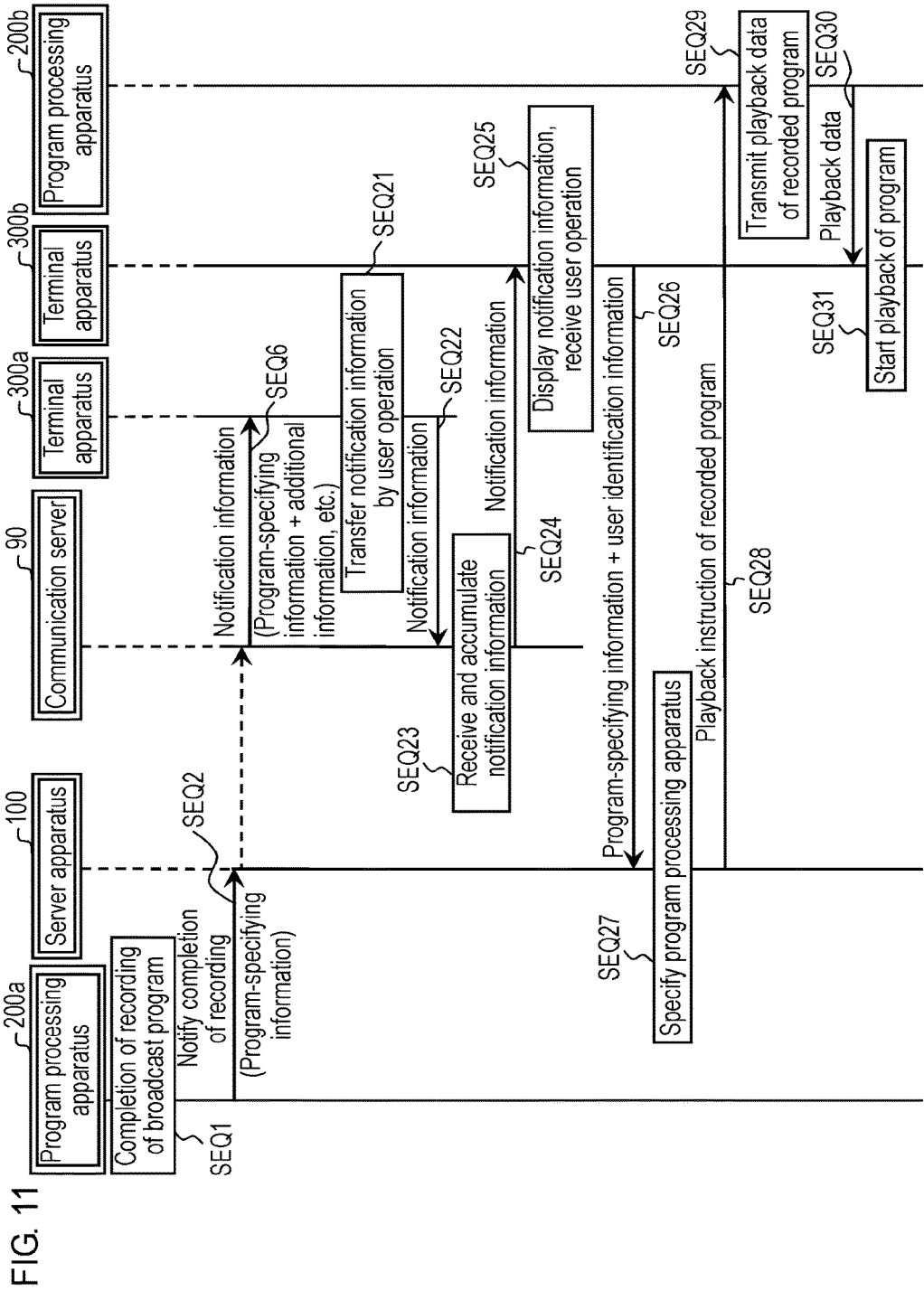
FIG. 11 is a sequence diagram illustrating another operational example related to playback of the recorded program to be performed by the information processing system according to the first exemplary embodiment.

FIG. 11 is a sequence diagram illustrating another operational example related to playback of the recorded program to be performed by information processing system 10 according to the first exemplary embodiment.

It is to be noted that in the communication sequence illustrated in FIG. 11, sequence SEQ 1 to sequence SEQ 6 substantially identical to sequence SEQ 1 to sequence SEQ 6 illustrated in FIG. 10 are executed (sequence SEQ 3 to sequence SEQ 5 are not illustrated in FIG. 11). A description of sequence SEQ 1 to sequence SEQ 6 will be omitted because of overlap. However, in sequence SEQ 6, notification information 50 is assumed to be transmitted from communication server 90 to terminal apparatus 300*a*.

On receipt of notification information 50 (refer to FIG. 6) from communication server 90 in sequence SEQ 6, terminal apparatus 300*a* displays information based on notification information 50 (for example, the character string that indicates the program name, or the like) on a display of terminal apparatus 300*a*. Then, terminal apparatus 300*a* receives the user operation based on the information displayed on the display. At this time, this user operation is assumed to be an instruction to transfer notification information 50 from user A to user B (that is, from terminal apparatus 300*a* to terminal apparatus 300*b*) (sequence SEQ 21).

Such a user operation of the transfer instruction may be performed, for example, when user A looks at notification information 50 displayed on the display of terminal apparatus 300*a* (for example, the character string of "program ABC", hyperlink display, and the like) and user A wants to recommend user B to view the broadcast program.

Terminal apparatus 300*a* that receives this user operation transmits notification information 50 that designates user B (or user identification information 31 on user B, or the like) as the transmission destination to communication server 90 (sequence SEQ 22).

On receipt of notification information 50 with the designated transmission destination from terminal apparatus 300*a*, communication server 90 accumulates notification information 50 in a storage medium (not illustrated) included in communication server 90 (sequence SEQ 23).

Then, communication server 90 transmits notification information 50 to the designated transmission destination (here, terminal apparatus 300*b* used by user B) (sequence SEQ 24).

It is to be noted that communication server 90 transmits notification information 50 to terminal apparatus 300*b* as follows, for example. For example, when user B accesses communication server 90 by using terminal apparatus 300*b*, communication server 90 recognizes that user B has accessed communication server 90, and then checks whether communication server 90 holds information to be transmitted to user B. When communication server 90 holds notification information 50 with user B designated as the transmission destination, communication server 90 transmits notification information 50 to terminal apparatus 300*b*.

It is to be noted that communication server 90 may operate so as to avoid duplicate transmission, to an identical user, of notification information 50 that has once been transmitted.

On receipt of notification information 50 from communication server 90, terminal apparatus 300*b* displays the information based on notification information 50 (for example, the character string that indicates the program name, or the like) on a display of terminal apparatus 300*b*. Then, terminal apparatus 300*b* receives the user operation based on the information displayed on the display (sequence SEQ 25).

When user B looks at the information displayed on the display of terminal apparatus 300*b* (for example, the character string of "program ABC", hyperlink display, or the like) and then performs the user operation of selecting the hyperlink in order to view the broadcast program, terminal apparatus 300*b* receives the user operation. On receipt of the user operation, terminal apparatus 300*b* accesses server apparatus 100 by using URL 52 (refer to FIG. 6) included in notification information 50, and then transmits program-specifying information 20 and user identification information 31 (for example, the login ID of user B, or the like) to server apparatus 100 (sequence SEQ 26).

It is to be noted that in sequence SEQ 26, server apparatus 100 that is accessed from terminal apparatus 300*b* may request user identification information 31 from terminal apparatus 300*b*. In response to the request, user identification information 31 may be transmitted from terminal apparatus 300*b* to server apparatus 100.

It is to be noted that, for example, when the login ID is used as user identification information 31 and a state where terminal apparatus 300*b* has logged in to server apparatus 100 continues from before execution of sequence SEQ 26, the login ID of user B has already been transmitted from terminal apparatus 300*b* to server apparatus 100, and thus terminal apparatus 300b may omit transmission of user identification information 31 in sequence SEQ 26.

Server apparatus 100 specifies program processing apparatus 200b corresponding to user identification information 31 of user B as program processing apparatus 200 to which the instruction is to be issued based on user identification information 31 on user B received in sequence SEQ 26 and association information 30 held in server apparatus 100 (refer to FIG. 4). Server apparatus 100 then specifies access information 32 for program processing apparatus 200b (for example, the ID of program processing apparatus 200b) (sequence SEQ 27).

It is assumed here that program processing apparatus 200b already has completed recording of program ABC, and has transmitted recorded content location information 42 regarding program ABC to server apparatus 100. In addition, it is assumed that server apparatus 100 has received recorded content location information 42, and has updated recording information 40 recorded in recorder 120.

Based on access information 32 specified in sequence SEQ 27 and program-specifying information 20 received in sequence SEQ 26, server apparatus 100 transmits the playback instruction for performing playback of the recorded program corresponding to program-specifying information 20 (for example, program ABC) to program processing apparatus 200b corresponding to access information 32 (sequence SEQ 28).

In sequence SEQ 28, server apparatus 100 transmits recorded content location information 42 corresponding to received program-specifying information 20 and the playback instruction of the recorded program to program processing apparatus 200b. It is assumed that the address information that specifies the position of terminal apparatus 300b that accesses server apparatus 100 in sequence SEQ 26 on line network 11 (for example, the Internet) is added to the playback instruction transmitted from server apparatus 100. This allows program processing apparatus 200b that receives the playback instruction to recognize the transmission destination of the playback data of the recorded program. It is to be noted that this address information, which is for example an IP address, may be other information.

Program processing apparatus 200b that receives the playback instruction and recorded content location information 42 specifies the recorded program (for example, program ABC) based on received recorded content location information 42. Program processing apparatus 200b then transmits the playback data of the recorded program (for example, video data and audio data necessary for playback of program ABC) to terminal apparatus 300b designated by the address information (sequence SEQ 29, sequence SEQ 30).

Terminal apparatus 300b that receives the playback data starts playback of the recorded program (for example, program ABC) based on the received playback data (sequence SEQ 31). This allows user B who uses terminal apparatus 300b to view the broadcast program (for example, program ABC) through a display or speaker of terminal apparatus 300b.

Thus, information processing system 10 described in the present exemplary embodiment allows the user (for example, user B) who uses terminal apparatus 300 (for example, terminal apparatus 300b) to know the information on the broadcast program from another user (for example, user A) through terminal apparatus 300 by a relatively simple operation. In addition, the user who uses terminal apparatus 300 can perform remote control of program processing apparatus 200 (for example, program processing apparatus 200b) from terminal apparatus 300 by a relatively simple operation, play the broadcast program recorded in program processing apparatus 200, and view the broadcast program on terminal apparatus 300.

[1-2-5. Recording Reservation of Broadcast Program by User Cooperation]

Next, the following describes the communication sequence in a case where information processing system 10 includes multiple program processing apparatuses 200 and multiple terminal apparatuses 300 and where multiple users cooperate, perform remote control of program processing apparatus 200, and perform recording reservation of the broadcast program.

The following describes the communication sequence in the case where information processing system 10 includes program processing apparatus 200a and terminal apparatus 300a used by user A, and program processing apparatus 200b and terminal apparatus 300b used by user B, where notification information 50 is transferred from user A to user B, and where user B performs remote control to instruct recording reservation from terminal apparatus 300b on program processing apparatus 200b.

It is to be noted that information processing system 10 may include three or more program processing apparatuses 200 and three or more terminal apparatuses 300.

Figure 12:
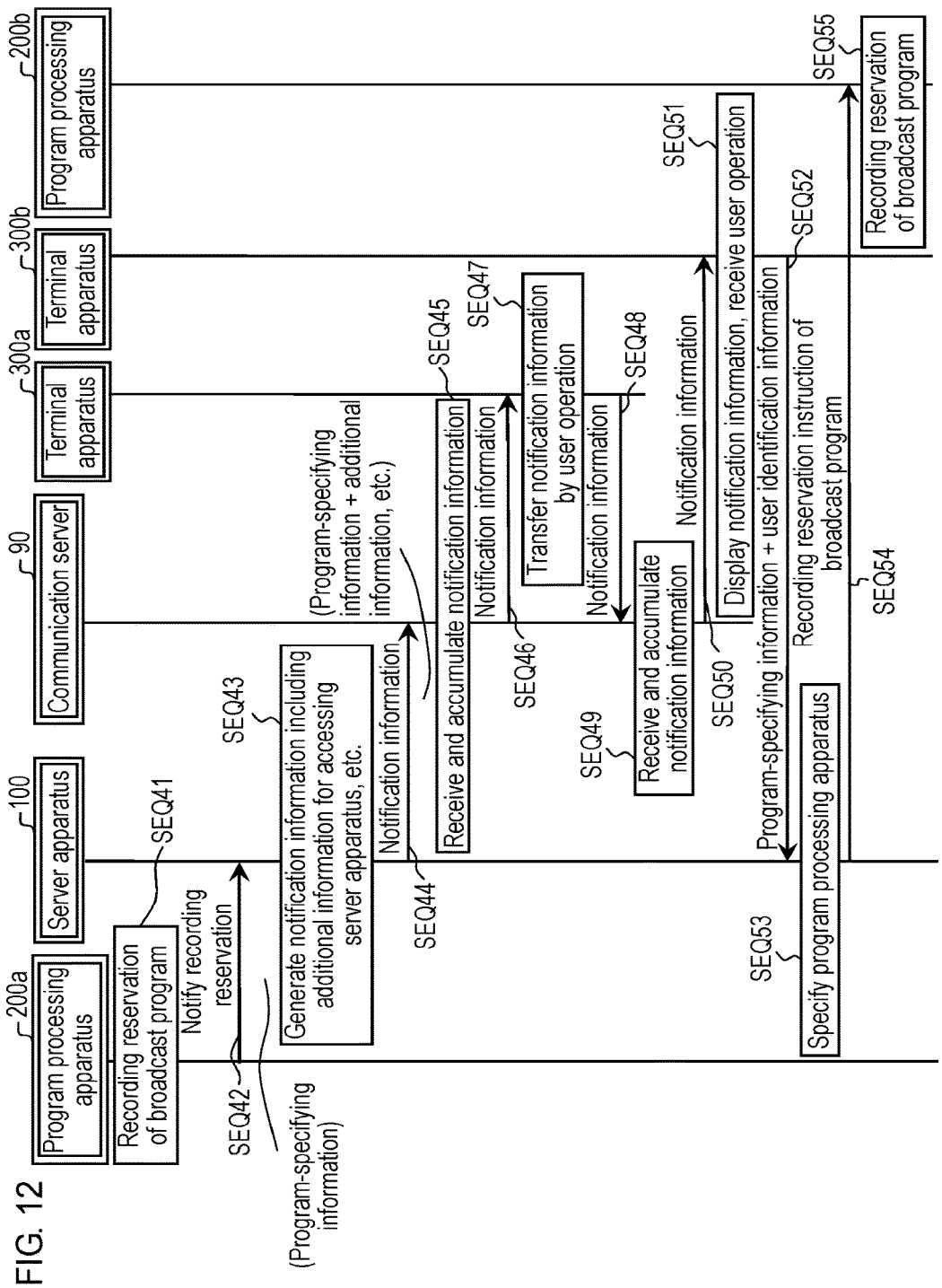
FIG. 12 is a sequence diagram illustrating an operational example related to recording reservation to be performed by the information processing system according to the first exemplary embodiment.

FIG. 12 is a sequence diagram illustrating an operational example related to recording reservation to be performed by information processing system 10 according to the first exemplary embodiment.

First, program processing apparatus 200a used by user A performs recording reservation of a broadcast program (sequence SEQ 41).

Hereinafter, the broadcast program of which recording reservation is performed by program processing apparatus 200a is assumed to be a broadcast program that includes in the program name the keyword registered by user A in program processing apparatus 200a in advance. In addition, the program name of this broadcast program is assumed to be "program ABC".

Program processing apparatus 200a that has performed recording reservation of the broadcast program (for example, program ABC) transmits, to server apparatus 100, a notification of the recording reservation including program-specifying information 20 (refer to FIG. 2) that specifies the broadcast program (sequence SEQ 42).

In addition, when recording reservation of the broadcast program is completed, in addition to the notification of the recording reservation, program processing apparatus 200a transmits ID 41 of program processing apparatus 200a to server apparatus 100.

On receipt of the notification of the recording reservation transmitted from program processing apparatus 200a, server apparatus 100 adds additional information for accessing server apparatus 100 to program-specifying information 20 included in the notification of the recording reservation, and then generates notification information 50 (refer to FIG. 6) (sequence SEQ 43).

Server apparatus 100 transmits notification information 50 generated in sequence SEQ 43 to communication server 90 (sequence SEQ 44).

On receipt of notification information 50 transmitted from server apparatus 100, communication server 90 accumulates notification information 50 in a storage medium (not illustrated) included in communication server 90 (sequence SEQ 45).

Communication server 90 transmits notification information 50 received in sequence SEQ 45 to terminal apparatus 300a of user A associated with program processing apparatus 200a that has transmitted the notification of the recording reservation in sequence SEQ 42 (sequence SEQ 46).

It is to be noted that the operation of respective apparatuses performed when communication server 90 transmits notification information 50 to terminal apparatus 300a is substantially identical to the operation described in sequence SEQ 6 of FIG. 10, and thus description thereof will be omitted.

It is to be noted that communication server 90 may operate so as to avoid duplicate transmission of notification information 50 that has once been transmitted.

On receipt of notification information 50 from communication server 90, terminal apparatus 300a displays the information based on notification information 50 (for example, the character string that indicates the program name, or the like) on a display of terminal apparatus 300a. Then, terminal apparatus 300a receives the user operation based on the information displayed on the display. At this time, this user operation is assumed to be an instruction to transfer notification information 50 from user A to user B (that is, from terminal apparatus 300a to terminal apparatus 300b) (sequence SEQ 47).

Such a user operation of the transfer instruction may be performed, for example, when user A looks at notification information 50 displayed on the display of terminal apparatus 300a (for example, the character string of "program ABC", hyperlink display, and the like) and user A wants to recommend user B to view the broadcast program.

Terminal apparatus 300a that receives this user operation transmits notification information 50 that designates user B (or user identification information 31 on user B, or the like) as the transmission destination to communication server 90 (sequence SEQ 48).

On receipt of notification information 50 with the designated transmission destination from terminal apparatus 300a, communication server 90 accumulates notification information 50 in a storage medium (not illustrated) included in communication server 90 (sequence SEQ 49).

Then, communication server 90 transmits notification information 50 to the designated transmission destination (here, terminal apparatus 300b used by user B) (sequence SEQ 50).

It is to be noted that the operation of respective apparatuses performed when communication server 90 transmits notification information 50 to terminal apparatus 300b is substantially identical to the operation described in sequence SEQ 24 of FIG. 11, and thus description thereof will be omitted.

It is to be noted that communication server 90 may operate so as to avoid duplicate transmission, to an identical user, of notification information 50 that has once been transmitted.

On receipt of notification information 50 from communication server 90, terminal apparatus 300b displays the information based on notification information 50 (for example, the character string that indicates the program name, or the like) on a display of terminal apparatus 300b. Then, terminal apparatus 300b receives the user operation based on the information displayed on the display (sequence SEQ 51).

When user B looks at the information displayed on the display of terminal apparatus 300b (for example, the character string of "program ABC", hyperlink display, and the like) and then performs the user operation of selecting the hyperlink in order to perform recording reservation of the broadcast program, terminal apparatus 300b receives the user operation. On receipt of the user operation, terminal apparatus 300b accesses server apparatus 100 by using URL 52 (refer to FIG. 6) included in notification information 50, and then transmits program-specifying information 20 and user identification information 31 (for example, the login ID of user B, or the like) to server apparatus 100 (sequence SEQ 52).

It is to be noted that in sequence SEQ 52, server apparatus 100 that is accessed from terminal apparatus 300b may request user identification information 31 from terminal apparatus 300b. In response to the request, user identification information 31 may be transmitted from terminal apparatus 300b to server apparatus 100.

It is to be noted that, for example, when the login ID is used as user identification information 31 and a state where terminal apparatus 300b has logged in to server apparatus 100 continues from before execution of sequence SEQ 52, the login ID of user B has already been transmitted from terminal apparatus 300b to server apparatus 100, and thus terminal apparatus 300b may omit transmission of user identification information 31 in sequence SEQ 52.

Server apparatus 100 specifies program processing apparatus 200b corresponding to user identification information 31 on user B as program processing apparatus 200 to which the instruction is to be issued based on user identification information 31 on user B received in sequence SEQ 52 and association information 30 held in server apparatus 100 (refer to FIG. 4). Server apparatus 100 then specifies access information 32 for program processing apparatus 200b (sequence SEQ 53).

It is to be noted that a time when server apparatus 100 specifies access information 32 for program processing apparatus 200b is assumed to be before the broadcast start time of the broadcast program corresponding to program-specifying information 20 (for example, program ABC).

Based on access information 32 specified in sequence SEQ 53 and program-specifying information 20 received in sequence SEQ 52, server apparatus 100 transmits the instruction to cause program processing apparatus 200b corresponding to access information 32 to perform recording reservation of the broadcast program corresponding to program-specifying information 20 (for example, program ABC) to program processing apparatus 200b (hereinafter the instruction is referred to as "recording reservation instruction") (sequence SEQ 54).

In sequence SEQ 54, server apparatus 100 transmits program-specifying information 20 received in sequence SEQ 52 (for example, program-specifying information 20 that specifies program ABC) and the predetermined recording reservation instruction to program processing apparatus 200b.

Program processing apparatus 200b that receives the recording reservation instruction and program-specifying information 20 specifies the broadcast program of which recording reservation should be carried out (for example, program ABC) based on received program-specifying information 20. Program processing apparatus 200b then performs recording reservation so that the broadcast program is recorded (sequence SEQ 55).

It is to be noted that when program processing apparatus 200b completes recording of the broadcast program of which recording reservation is performed in sequence SEQ 55, program processing apparatus 200b transmits program-specifying information 20 on the recorded broadcast program (for example, program ABC) and recorded content location information 42 that indicates the recording area of the broadcast program to server apparatus 100.

It is to be noted that the operation of respective apparatuses performed when the recorded program recorded in program processing apparatus 200 is played by remote control from terminal apparatus 300 is as described above, and thus description thereof will be omitted.

Thus, information processing system 10 described in the present exemplary embodiment allows the user (for example, user B) who uses terminal apparatus 300 (for example, terminal apparatus 300b) to know information on the broadcast program from another user (for example, user A) through terminal apparatus 300 by a relatively simple operation. In addition, the user who uses terminal apparatus 300 can perform remote control of program processing apparatus 200 (for example, program processing apparatus 200b) from terminal apparatus 300 by a relatively simple operation, and can cause program processing apparatus 200 to perform recording reservation of the broadcast program.

[1-3. Effect, Etc.]

As described above, a server apparatus according to the present exemplary embodiment includes a storage, an acquisition unit, and a controller. The storage stores association information that associates access information on a program processing apparatus corresponding to user identification information with the user identification information. The acquisition unit acquires the user identification information and program-specifying information that specifies a broadcast program. The controller specifies the access information on the association information from the user identification information. Then, by using the access information, the controller causes the program processing apparatus to perform processing regarding the broadcast program specified by the program-specifying information acquired by the acquisition unit.

Accordingly, even if the user does not directly operate the program processing apparatus, the server apparatus can cause the program processing apparatus used by the user to perform processing on the broadcast program based on a user instruction by acquiring the program-specifying information and the user identification information from the user. That is, the user can perform remote control of the program processing apparatus through the terminal apparatus and the server apparatus. For example, the user can perform remote control of the program processing apparatus from the terminal apparatus, play the broadcast program recorded in the program processing apparatus, view the broadcast program on the terminal apparatus, and the like. Therefore, the server apparatus described in the present exemplary embodiment is useful to the user who is at a place distant from the program processing apparatus.

The server apparatus may further include a storage that stores association information. For each user registered in the server apparatus, the user identification information and the access information may be registered in association with each other in the association information. In addition, the acquisition unit may acquire the user identification information and the program-specifying information from an external terminal apparatus, and the controller may specify the access information with reference to the association information stored in the storage.

Accordingly, for example, even if the user is at a place distant from the program processing apparatus used by the user, the user can cause the program processing apparatus to perform processing on the broadcast program by operating the terminal apparatus and transmitting the program-specifying information and the user identification information to the server apparatus.

In addition, in the server apparatus, the controller may determine processing to cause the program processing apparatus to perform based on a comparison between a broadcast time of the broadcast program specified by the program-specifying information acquired by the acquisition unit and a current time.

This allows the server apparatus to switch processing to cause the program processing apparatus to perform according to whether the broadcast program specified by the program-specifying information has already been broadcasted.

In addition, the server apparatus may further include a recorder that records recording information indicating the broadcast program recorded in the program processing apparatus. The recorder may acquire information that indicates the broadcast program recorded in the program processing apparatus from the program processing apparatus to update the recording information. When the current time exceeds the broadcast time of the broadcast program specified by the program-specifying information, the controller may check whether the broadcast program specified by the program-specifying information has been recorded in the program processing apparatus with reference to the recording information. Depending on a result of the check, the controller may determine processing to cause the program processing apparatus to perform.

This allows the server apparatus to appropriately switch processing to cause the program processing apparatus to perform depending on whether the program processing apparatus has recorded the broadcast program specified by the program-specifying information. For example, in a case where the program processing apparatus has recorded the broadcast program, the server apparatus can cause the program processing apparatus to play the recorded broadcast program.

In addition, the server apparatus may cause the recording information to include location information that indicates which recording area of the program processing apparatus records the broadcast program recorded in the program processing apparatus. When the current time exceeds the broadcast time of the broadcast program specified by the program-specifying information and when the broadcast program specified by the program-specifying information has been recorded in the program processing apparatus, the controller may determine playback of the broadcast program recorded in the program processing apparatus as processing to cause the program processing apparatus to perform, and then the controller may transmit the location information on the broadcast program to the program processing apparatus.

This allows the program processing apparatus, in a case where the broadcast program specified by the program-specifying information has been recorded, to acquire the location information on the broadcast program from the server apparatus, and to retrieve and play the recorded broadcast program based on the location information. Therefore, the program processing apparatus can play the broadcast program more quickly than in a case of retrieving and playing the recorded broadcast program based on the program-specifying information.

In addition, in the server apparatus, when the current time exceeds the broadcast time of the broadcast program specified by the program-specifying information and when the broadcast program specified by the program-specifying information has been recorded in the program processing apparatus, the controller may cause the program processing apparatus to perform playback of the broadcast program recorded in the program processing apparatus.

This allows the user, even if it is unknown whether the broadcast program specified by the program-specifying information has already been broadcasted, if the program processing apparatus has recorded the broadcast program, to perform remote control of the program processing apparatus from the terminal apparatus, and to play the broadcast program recorded in the program processing apparatus. That is, the user can perform remote control of the program processing apparatus from the terminal apparatus, play the broadcast program recorded in the program processing apparatus, and view the broadcast program on the terminal apparatus.

In addition, in the server apparatus, when the current time is before the broadcast time of the broadcast program specified by the program-specifying information, the controller may cause the program processing apparatus to perform recording reservation of the broadcast program specified by the program-specifying information.

This allows the user, even if it is unknown whether the broadcast program specified by the program-specifying information has already been broadcasted, if broadcasting of the broadcast program has not finished, to perform remote control of the program processing apparatus from the terminal apparatus, and to perform recording reservation of the broadcast program.

In addition, in the server apparatus, the broadcast time of the broadcast program specified by the program-specifying information may indicate a broadcast period of the broadcast program. When the current time is included in the broadcast period, the controller may cause the program processing apparatus to perform playback of the broadcast program.

This allows the user, even if it is unknown whether the broadcast program specified by the program-specifying information is on air, if the broadcast program is on air, to perform remote control of the program processing apparatus from the terminal apparatus, and to play the broadcast program. That is, the user can perform remote control of the program processing apparatus from the terminal apparatus, cause the program processing apparatus to receive the broadcast program that is on air, and view the broadcast program on the terminal apparatus.

In addition, in the server apparatus, based on a comparison between the broadcast time of the broadcast program specified by the program-specifying information acquired by the acquisition unit and the current time, the controller may generate processing candidate information that indicates a processing candidate to cause the program processing apparatus to perform, and the controller may transmit the processing candidate information to the terminal apparatus.

This allows the user to check, on the terminal apparatus, processing to cause the program processing apparatus to perform regarding the broadcast program specified by the program-specifying information.

In addition, in the server apparatus, the acquisition unit may acquire processing information that indicates processing to perform regarding the broadcast program from the terminal apparatus. The controller may cause the program processing apparatus to perform the processing based on the processing information regarding the broadcast program specified by the program-specifying information acquired by the acquisition unit.

This allows the user, when remote control of the program processing apparatus is performed from the terminal apparatus, to designate the processing to cause the program processing apparatus to perform.

In addition, in the server apparatus, the program-specifying information may include a network ID, service ID, transport stream ID regarding the broadcast program, and information that indicates a start time of the broadcast program specified by the program-specifying information.

Accordingly, since the broadcast program is uniquely specified by the program-specifying information, the user can optionally designate any broadcast program to be processed from the terminal apparatus, and can perform remote control of the program processing apparatus.

The information processing system according to the present exemplary embodiment includes a terminal apparatus, a server apparatus, and a program processing apparatus. The server apparatus includes an acquisition unit, a storage, and a controller. The acquisition unit acquires user identification information and program-specifying information that specifies a broadcast program from the terminal apparatus. The storage stores association information for each user registered in the server apparatus. The association information is information that associates the user identification information with access information on the program processing apparatus. The controller specifies the access information based on the association information and the user identification information acquired by the acquisition unit. Then, the controller accesses the program processing apparatus by using the access information, and causes the program processing apparatus to perform processing regarding the broadcast program specified by the program-specifying information acquired by the acquisition unit.

Accordingly, even if the user does not directly operate the program processing apparatus, the server apparatus can cause the program processing apparatus used by the user to perform processing on the broadcast program based on the user instruction by acquiring the program-specifying information and the user identification information from the user. That is, the user can perform remote control of the program processing apparatus through the terminal apparatus and the server apparatus. For example, the user can perform remote control of the program processing apparatus from the terminal apparatus, play the broadcast program recorded in the program processing apparatus, view the broadcast program on the terminal apparatus, and the like. Therefore, the information processing system described in the present exemplary embodiment is useful to the user who is at a place distant from the program processing apparatus.

In the information processing system, the program processing apparatus may transmit the program-specifying information that specifies the broadcast program processed by the program processing apparatus to the server apparatus. On receipt of the program-specifying information transmitted from the program processing apparatus, the server apparatus may add additional information for accessing the server apparatus to the received program-specifying information to generate notification information, and then the server apparatus may transmit the notification information to the terminal apparatus or an external device. This external device may be, for example, a communication server, an email server, or the like that can accumulate and deliver information.

This allows the server apparatus to transmit the program-specifying information that specifies the broadcast program processed by the program processing apparatus and information for accessing the server apparatus from the server apparatus to the terminal apparatus, or from the server apparatus via the external device to the terminal apparatus. Therefore, the user who uses the terminal apparatus can access the server apparatus from the terminal apparatus by using these pieces of information, and can cause the program processing apparatus to perform processing on the broadcast program (for example, playback or the like) through the server apparatus. These pieces of information may be shared with a plurality of users.

In addition, in the information processing system, the server apparatus may cause the notification information to include character string information that represents information related to the broadcast program specified by the program-specifying information.

This allows the user, when remote control of the program processing apparatus is performed from the terminal apparatus through the server apparatus, to check information regarding the broadcast program (for example, the program name of the broadcast program, and the like) on the terminal apparatus.

In addition, in the information processing system, the external device may have a function to transmit information transmitted from the server apparatus to the terminal apparatus.

This allows the server apparatus to transmit information to be transmitted to the terminal apparatus, from the server apparatus via the external device to the terminal apparatus. Therefore, in the information processing system, the information may also be shared with a plurality of users.

In addition, in the information processing system, the server apparatus may generate the information obtained by addition of the additional information to the program-specifying information in URL form.

This allows the user who uses the terminal apparatus to access the server apparatus from the terminal apparatus by using the URL.

A control program according to the present exemplary embodiment is a control program for causing a computer including a processor to execute server processing. The server processing includes an acquisition step of acquiring user identification information and program-specifying information that specifies a broadcast program, and a control step. The control step is a step of specifying access information based on association information and the user identification information acquired in the acquisition step. The association information is information that associates the user identification information with the access information on the program processing apparatus. The control step is a step of accessing the program processing apparatus by using the access information, and causing the program processing apparatus to perform processing regarding the broadcast program specified by the program-specifying information acquired in the acquisition step.

Accordingly, even if the user does not directly operate the program processing apparatus, by acquiring the program-specifying information and the user identification information from the user, the server apparatus can cause the program processing apparatus used by the user to perform processing on the broadcast program in response to a user instruction. That is, the user can perform remote control of the program processing apparatus through the terminal apparatus and the server apparatus. For example, the user can perform remote control of the program processing apparatus from the terminal apparatus to play the broadcast program recorded in the program processing apparatus, can view the broadcast program on the terminal apparatus, and the like. Therefore, the control program described in the present exemplary embodiment is useful to the user who is at a place distant from the program processing apparatus.

It is to be noted that these various comprehensive or specific aspects include a combination of one or more of an apparatus, a system, a method, an integrated circuit, a computer program, a computer-readable recording medium, and the like.

It is to be noted that information processing system 10 is one example of the information processing system. Each of program-specifying information 20, program-specifying information 52b, and program-specifying information 62b is one example of the program-specifying information. Association information 30 is one example of the association information. User identification information 31 is one example of the user identification information. Access information 32 is one example of the access information. Each of recording information 40 and recording information 40a is one example of the recording information. Recorded content location information 42 is one example of the location information. Notification information 50 is one example of the notification information. Each of character string information 51 and character string information 61 is one example of the character string information. Each of additional information 52a and additional information 62a is one example of the additional information. Each of URL 52 and URL 62 is one example of the URL. Processing candidate information 60 is one example of the processing candidate information. Processing information 62c is one example of the processing information. Communication server 90 is one example of the external device. Server apparatus 100 is one example of the server apparatus. Storage 110 is one example of the storage. Recorder 120 is one example of the recorder. Acquisition unit 140 is one example of the acquisition unit. Controller 150 is one example of the controller. Each of program processing apparatus 200, program processing apparatus 200a, and program processing apparatus 200b is one example of the program processing apparatus. Each of terminal apparatus 300, terminal apparatus 300a, and terminal apparatus 300b is one example of the terminal apparatus. Each of playback of the recorded program, playback of the broadcast program, and recording reservation of the broadcast program is one example of the processing to cause the program processing apparatus to perform.

Other Exemplary Embodiments

As described above, the first exemplary embodiment has been described as illustration of the technique to be disclosed in this application. However, the technique in the present disclosure is not limited to this example, and may be applied to exemplary embodiments to which changes, replacements, additions, and omissions have been made. In addition, it is also possible to make a new exemplary embodiment by combining components described in the above-described first exemplary embodiment.

Thus, other exemplary embodiments will be described below.

The first exemplary embodiment has described the example in which program-specifying information 20 includes information such as network ID 21, service ID 22, transport stream ID 23, and start time 24. However, program-specifying information 20 may be any information that allows identification of the broadcast program that can be acquired by program processing apparatus 200 included in information processing system 10. Program-specifying information 20 may include information other than the above-described information.

The first exemplary embodiment has described the operational example in which, after recording the broadcast program, program processing apparatus 200 transmits recorded content location information 42 to server apparatus 100. However, program processing apparatus 200 may transmit recorded content location information 42 to server apparatus 100 both when recording is started and when recording is completed. In this operational example, program processing apparatus 200 may transmit information for distinguishing between start and completion of recording to server apparatus 100. In addition, server apparatus 100 may reflect these pieces of information on recording information 40, and when controlling program processing apparatus 200, server apparatus 100 may change processing to cause program processing apparatus 200 to perform, depending on whether program processing apparatus 200 is recording the broadcast program or has finished recording.

In addition, program processing apparatus 200 does not necessarily need to transmit recorded content location information 42 to server apparatus 100. In this case, server apparatus 100 may inquire of program processing apparatus 200 whether the broadcast program has been recorded in step S28 of the control processing.

Although the first exemplary embodiment has described the example in which program processing apparatus 200 has a function to receive the broadcast program, program processing apparatus 200 does not necessarily need to have the function to receive the broadcast program. For example, program processing apparatus 200 may have a function to read the broadcast program from a recording medium in which an external device receives and records the broadcast program, and to play the read broadcast program. Program processing apparatus 200 may transmit to server apparatus 100, for example, program-specifying information 20 on the broadcast program recorded in the recording medium, and recorded content location information 42 that indicates the recording area of the broadcast program in the recording medium. The server apparatus may receive these pieces of information to update recording information 40.

Communication server 90 described in the first exemplary embodiment may be an email server, for example. In addition, communication server 90 does not necessarily need to have a function to transmit received information with the transmission destination designated, to the transmission destination. Alternatively, communication server 90 may have a function to transmit received information to a user who accesses communication server 90 (or terminal apparatus 300 operated by the user).

Although the first exemplary embodiment has described the operation example in which server apparatus 100 transmits notification information 50 to communication server 90, server apparatus 100 may have a mail server function to accumulate and transmit emails to the user. In this case, server apparatus 100 may cause notification information 50 to be included in an email to the user to whom notification information 50 is to be transmitted. In this configuration example, every time the user accesses (logs in to) server apparatus 100 from terminal apparatus 300, the user can acquire emails for the user. In addition, server apparatus 100 may cause information necessary when the user accesses communication server 90 to be included in the account information held for each user. In this case, server apparatus 100 can transmit notification information 50 to communication server 90 used by the user to whom notification information 50 is to be transmitted.

The first exemplary embodiment has described the operational example in which, when recording reservation and recording of the broadcast program are performed, program processing apparatus 200 transmits program-specifying information 20 that indicates the broadcast program to server apparatus 100. However, program processing apparatus 200 may transmit program-specifying information 20 to server apparatus 100 also when performing other processing. Program processing apparatus 200 may transmit program-specifying information 20 that indicates the broadcast program to server apparatus 100, for example, when program processing apparatus 200 receives the broadcast program, starts to record the broadcast program, plays the broadcast program, reserves playback of the broadcast program, or the like.

Program processing apparatus 200 does not necessarily need to include transmitter 210.

Based on a comparison between the broadcast time of the broadcast program and the current time, server apparatus 100 may generate processing candidate information that indicates multiple candidates of processing to cause program processing apparatus 200 to perform. Server apparatus 100 may then transmit the processing candidate information to terminal apparatus 300 that accesses server apparatus 100. In addition, server apparatus 100 may add, to the current time, a delay time needed for an instruction to reach program processing apparatus 200 from server apparatus 100, and may then compare a time obtained by the addition with the broadcast time.

In addition, the processing information described in the first exemplary embodiment may be any information that specifies the processing to cause program processing apparatus 200 to perform. The processing information does not necessarily be chosen from the choices indicated by the processing candidate information. Since terminal apparatus 300 transmits the processing information to server apparatus 100, server apparatus 100 can cause program processing apparatus 200 to perform processing indicated by the processing information regarding the broadcast program specified by the program-specifying information acquired by acquisition unit 140.

The first exemplary embodiment has cited the login ID of the user as an example of user identification information 31. User identification information 31 may be information that allows identification of terminal apparatus 300 used by the user. User identification information 31 may be, for example, a media access control (MAC) address, global internet protocol (IP) address of terminal apparatus 300, or the like. In addition, in a case where user identification information 31 is information that allows identification of terminal apparatus 300, when terminal apparatus 300 accesses server apparatus 100, terminal apparatus 300 may transmit user identification information 31 to server apparatus 100 without receiving user input operation.

Terminal apparatus 300 does not necessarily be a portable apparatus.

Access information 32 may be, for example, address information (for example, IP address) that specifies a position of program processing apparatus 200 on line network 11 (for example, the Internet), and may be a telephone number of a telephone line for communication, or the like.

The first exemplary embodiment has cited the program name of the broadcast program as an example of character string information 51 included in notification information 50. Other examples of character string information 51 include a description of the broadcast program, information about cast members, information that introduces articles and places within the broadcast program, and the like. In addition, character string information 51 may be a reason why program-specifying information 20 of the broadcast program is transmitted from program processing apparatus 200, information that represents a degree of recommendation of the broadcast program, and the like.

The first exemplary embodiment has described the operational example in which user identification information 31 and program-specifying information 20 are transmitted from terminal apparatus 300 to server apparatus 100. However, server apparatus 100 may include an input function, and may be configured so that the user inputs user identification information 31 and program-specifying information 20 in server apparatus 100 through this input function.

Another exemplary embodiment of server apparatus 100 will be described below. For example, it is assumed that broadcasting station A and broadcasting station B are broadcasting stations in common affiliation (hereinafter referred to as "affiliated stations"). The broadcasting stations in common affiliation refer to broadcasting stations that belong to one group, and refer to broadcasting stations that broadcast substantially common broadcast programs at identical time. Server apparatus 100 may have a function to convert program-specifying information 20 that indicates a broadcast program broadcasted from broadcasting station A that can be received in a certain area into program-specifying information 20 that indicates a broadcast program broadcasted from broadcasting station B that can be received in another area in which program processing apparatus 200 is installed. This function will be described with reference to FIG. 13 and FIG. 14.

FIG. 13 is a diagram schematically illustrating one configuration example of recording information 40a according to another exemplary embodiment.

FIG. 14 is a diagram schematically illustrating one configuration example of affiliated station information 70 according to another exemplary embodiment. As illustrated in FIG. 14, affiliated station information 70 is information in which, for each affiliation, each broadcasting station is registered in association with area 71 in which broadcast programs from the broadcasting station can be received (hereinafter the area is also referred to as "receivable area").

For example, instead of recording information 40, server apparatus 100 records recording information 40a (FIG. 13) including area information 41a, and affiliated station information 70 (FIG. 14) in recorder 120. As illustrated in FIG. 13, recording information 40a is information that associates ID 41 of program processing apparatus 200, area information 41a, recorded content location information 42, and program-specifying information 20 with one another. It is to be noted that area information 41a refers to information that indicates the area in which program processing apparatus 200 is installed.

First, as initial settings, for example, a user input causes program processing apparatus 200 to store area information 41a that indicates the area in which program processing apparatus 200 is installed. When transmitting recorded content location information 42 to server apparatus 100, program processing apparatus 200 also transmits area information 41a. Then, server apparatus 100 receives area information 41a and recorded content location information 42 transmitted from program processing apparatus 200, and then server apparatus 100 updates recording information 40a.

FIG. 13 illustrates recording information 40a on program processing apparatus 200a and program processing apparatus 200b as one example. In the example illustrated in FIG. 13, in recording information 40a, "01010" is registered as ID 41 of program processing apparatus 200a, "Tokyo" is registered as area information 41a that indicates the area in which program processing apparatus 200a is installed, recorded content ID "00005" is registered as recorded content location information 42, "001002003" is registered as program-specifying information 20, and these pieces of information are associated with one another. It is to be noted that details of program-specifying information 20, which have been described with reference to FIG. 5, will be omitted. In addition, because of overlap, description regarding recording information 40 on program processing apparatus 200b specified by ID 41 "01012" will also be omitted.

FIG. 14 illustrates affiliated station information 70 as one example in which broadcasting stations that belong to A affiliation 72a (for example, Tokyo A Television, Osaka A Television, and the like), broadcasting stations that belong to B affiliation 72b (for example, B Television Tokyo, B Television Osaka, and the like), and broadcasting stations that belong to C affiliation 72c (for example, C Tokyo Broadcasting, C Osaka Broadcasting, and the like) are registered in association with the receivable area. It is to be noted that in the example illustrated in FIG. 14, although each affiliated station is denoted by a broadcasting station name, each affiliated station may be denoted by the network ID and the service ID, for example.

The example illustrated in FIG. 14 indicates, for example, that broadcast programs broadcasted by "Osaka A Television" having the receivable area in Osaka are substantially identical to broadcast programs broadcasted by "Tokyo A Television" having the receivable area in Tokyo. The example also indicates that program-specifying information 20 that indicates the broadcast programs of Osaka A Television and program-specifying information 20 that indicates the broadcast programs of Tokyo A Television can replace each other (that is, interconvertible).

On receipt of user identification information 31 and program-specifying information 20 from terminal apparatus 300, controller 150 of server apparatus 100 specifies the area in which program processing apparatus 200 corresponding to user identification information 31 is installed with reference to association information 30 (refer to FIG. 4), recording information 40a (refer to FIG. 13), and affiliated station information 70 (refer to FIG. 14). Controller 150 then determines whether the broadcast program indicated by received program-specifying information 20 can be received in the area. On determination that the broadcast program cannot be received, controller 150 converts received program-specifying information 20 into program-specifying information 20 corresponding to the broadcast program that can be received in the area.

For example, when the area in which program processing apparatus 200 corresponding to received user identification information 31 is installed is Tokyo and the broadcast program indicated by received program-specifying information 20 is the broadcast program of Osaka A Television, controller 150 converts received program-specifying information 20 into program-specifying information 20 of the identical broadcast program broadcasted from Tokyo A Television. Then, controller 150 performs subsequent processing based on program-specifying information 20 after conversion. The operation of each apparatus after this conversion is substantially identical to the operation described in the first exemplary embodiment, and thus description thereof will be omitted. This configuration allows further improvement in convenience of the user who uses server apparatus 100.

Thus, in the server apparatus described in the present exemplary embodiment, when the program processing apparatus corresponding to the access information specified based on the user identification information acquired by the acquisition unit is installed in the area in which the program processing apparatus cannot receive the broadcast program specified by the program-specifying information acquired by the acquisition unit, the controller may convert the program-specifying information into the program-specifying information corresponding to the broadcast program that can be received in the area in which the program processing apparatus is installed, the broadcast program being substantially identical to the broadcast program specified by the program-specifying information.

This allows the server apparatus, even when the program processing apparatus is installed in the area (for example, Osaka) in which the program processing apparatus cannot receive the broadcast program specified by the program-specifying information acquired by the server apparatus (for example, "program ABC" broadcasted in Tokyo), to convert the acquired program-specifying information into the program-specifying information corresponding to the broadcast program that can be received in the area in which the program processing apparatus is installed, the broadcast program being identical to the broadcast program specified by the program-specifying information (for example, "program ABC" broadcasted in Osaka).

The first exemplary embodiment has described the operational example of transmitting the processing candidate information for indicating the choices of processing to the user from server apparatus 100 to terminal apparatus 300. In addition, the first exemplary embodiment has described the operational example of transmitting the instruction based on the selection processing made at this time from terminal apparatus 300 via server apparatus 100 to program processing apparatus 200. However, terminal apparatus 300 may transmit this instruction directly to program processing apparatus 200. In addition, instead of the processing candidate information, server apparatus 100 may transmit access information 32 on program processing apparatus 200 and recorded content location information 42 to terminal apparatus 300. Then, when an application program for viewing broadcast programs included in terminal apparatus 300 starts, the choices of processing to be presented to the user may be displayed on a display of terminal apparatus 300. This configuration allows terminal apparatus 300 to transmit the instruction based on a result of the user selection operation directly to program processing apparatus 200.

The first exemplary embodiment has described the operational example in which communication server 90 transmits notification information 50 (refer to FIG. 6) to terminal apparatus 300 in response to the access from terminal apparatus 300. For example, instead of receiving notification information 50 from communication server 90, terminal apparatus 300 may read information printed on paper or the like representing notification information 50 (for example, a barcode) by using a camera included in terminal apparatus 300.

As described above, the exemplary embodiments have been described as illustration of the technique in the present disclosure. For this purpose, the accompanying drawings and detailed description have been provided.

Accordingly, the components described in the accompanying drawings and detailed description may include not only essential components for solving problems but also unessential components for solving problems in order to illustrate the above-described technique. For this reason, it should not be acknowledged immediately that those unessential components be essential because those unessential components are described in the accompanying drawings and detailed description.

In addition, since the above-described exemplary embodiments are intended to illustrate the technique in the present disclosure, various changes, replacements, additions, omissions, etc. may be made within the scope of the appended claims or equivalents thereof.

Execution sequence of processing steps in information processing system 10 described in the first exemplary embodiment (for example, the flow illustrated in FIG. 8 or FIG. 9) is not necessarily limited to sequence as described in the first exemplary embodiment. The execution sequence can be exchanged without departing from the spirit of the disclosure.

Respective functional components of server apparatus 100 described in the first exemplary embodiment may be installed in different apparatuses separated from one another. Respective functional components in the separated apparatuses may operate in cooperation by wired or wireless communication with one another to implement processing similar to processing performed by server apparatus 100 described in the first exemplary embodiment.

Functional components (functional blocks) of each apparatus in information processing system 10 may be individually integrated into one chip by using a semiconductor device, such as an integrated circuit (IC), large scale integration (LSI), or the like, or may be integrated into one chip so as to contain part or all of the functional components. In addition, a method of circuit integration is not limited to LSI, and circuit integration may be implemented using a dedicated circuit or a general-purpose processor. A field programmable gate array (FPGA) or a reconfigurable processor, in which connections or settings of circuit cells within the LSI are reconfigurable, may be used after manufacturing by LSI. Furthermore, if an advance in semiconductor technologies or other related technologies yield a circuit integration technology that can substitute for LSI, the functional blocks may be integrated using such a technology.

All or part of respective processing steps in information processing system 10 described in the first exemplary embodiment (for example, the flow illustrated in FIG. 8 or FIG. 9) may be implemented by hardware of each apparatus, and may be implemented using software. It is to be noted that processing by software is implemented by a processor included in each apparatus executing a control program stored in a memory. Also, the control program may be recorded in a recording medium to be distributed or circulated. For example, installing the distributed control program in the apparatus and causing the processor of the apparatus to execute the control program makes it possible to cause the apparatus to perform various processing steps (for example, the flow illustrated in FIG. 8 or FIG. 9).

INDUSTRIAL APPLICABILITY

The present disclosure is applicable to a system and an apparatus in which the user performs remote control of the program processing apparatus. Specifically, the present disclosure is applicable to devices such as a portable terminal, smartphone, tablet computer, personal computer, television receiver, radio receiver, moving picture (audio) playback apparatus, moving picture (audio) recording apparatus, recording and playback apparatus, and server computer.

REFERENCE MARKS IN THE DRAWINGS

10: information processing system
11: line network
20: program-specifying information
21: network ID
22: service ID 23: transport stream ID
24: start time
30: association information
31: user identification information
32: access information
40, 40a: recording information
41: ID
41a: area information
42: recorded content location information
50: notification information
51, 61: character string information
52, 62: URL
52a, 62a: additional information
52b, 62b: program-specifying information
60: processing candidate information
62c: processing information
70: affiliated station information
71: area
72a: A affiliation
72b: B affiliation
72c: C affiliation
90: communication server
100: server apparatus
110: storage
120: recorder
130: communicator
140: acquisition unit
150: controller
200, 200a, 200b: program processing apparatus
210: transmitter
300, 300a, 300b: terminal apparatus

The invention claimed is:

1. A server apparatus configured to connect with a plurality of program processing apparatus and a plurality of terminal apparatus, the server apparatus comprising:
a storage that stores association information that associates each of access information corresponding to each of the plurality of program processing apparatus respectively, with each of user identification information corresponding to each of the plurality of terminal apparatus respectively;
an acquisition unit that acquires the user identification information and program-specifying information;
a communicator that transmits the program-specifying information and information specifying an address of the server apparatus to a second terminal apparatus, when the acquisition unit acquires, from a first terminal apparatus, the program-specifying information and user identification corresponding to the second terminal apparatus, the second terminal apparatus being a transmission destination; and
a controller that specifies a second program processing apparatus corresponding to the access information associated with the user identification information corresponding to the second terminal apparatus, based on the association information stored in the storage, and cause the second program processing apparatus to perform processing regarding a broadcast program specified by the program-specifying information, when the acquisition unit acquires, from the second terminal apparatus, the program-specifying information and the user identification information corresponding to the second terminal apparatus.

2. The server apparatus according to claim 1, wherein the communicator transmits the program-specifying information and the information specifying the address of the server apparatus to the first terminal apparatus, when the acquisition unit acquires, from a first program processing apparatus, the program-specifying information that specifies a recorded broadcast program, and
the communicator transmits the program-specifying information and the information specifying the address of the server apparatus to the second terminal apparatus, when the acquisition unit acquires, from the first terminal apparatus, the program-specifying information and the user identification information corresponding to the second terminal apparatus.

3. The server apparatus according to claim 1, wherein when the current time exceeds the broadcast time of the broadcast program specified by the program-specifying information and when the broadcast program specified by the program-specifying information has been recorded in the second program processing apparatus, the controller causes the second program processing apparatus to perform playback of the broadcast program recorded in the second program processing apparatus.

4. The server apparatus according to claim 1, wherein when the current time is before the broadcast time of the broadcast program specified by the program-specifying information, the controller causes the second program processing apparatus to perform recording reservation of the broadcast program specified by the program-specifying information.

5. The server apparatus according to claim 1, wherein the broadcast time of the broadcast program specified by the program-specifying information indicates a broadcast period of the broadcast program, and
when the current time is included in the broadcast period, the controller causes the second program processing apparatus to perform playback of the broadcast program.

6. The server apparatus according to claim 1, further comprising a recorder that records recording information indicating the broadcast program recorded in the second program processing apparatus,
wherein the recorder acquires, from the second program processing apparatus, information that indicates the broadcast program recorded in the second program processing apparatus to update the recording information,
when the current time exceeds the broadcast time of the broadcast program specified by the program-specifying information, the controller checks whether the broadcast program specified by the program-specifying information has been recorded in the second program processing apparatus with reference to the recording information, and depending on a result of the check, the controller determines processing to cause the second program processing apparatus to perform.

7. The server apparatus according to claim 6, wherein the recording information includes location information that indicates which recording area of the second program processing apparatus records the broadcast program recorded in the second program processing apparatus,
when the current time exceeds the broadcast time of the broadcast program specified by the program-specifying information and when the broadcast program specified by the program-specifying information has been recorded in the second program processing apparatus, the controller determines playback of the broadcast program recorded in the second program processing apparatus as the processing to cause the second program processing apparatus to perform, and then the controller transmits the location information of the broadcast program to the second program processing apparatus.

8. The server apparatus according to claim 1, wherein when the second program processing apparatus corresponding to the access information specified based on the user identification information acquired by the acquisition unit is installed in an area in which the broadcast program specified by the program-specifying information acquired by the acquisition unit cannot be received, the controller converts the program-specifying information into the program-specifying information corresponding to a broadcast program that can be received in the area in which the second program processing apparatus is installed, the broadcast program being substantially identical to the broadcast program specified by the program-specifying information.

9. An information processing system comprising:
a plurality of terminal apparatus;
a plurality of program processing apparatus; and
a server apparatus:
the server apparatus including:
a storage that stores association information that associates each of access information corresponding to each of the plurality of program processing apparatus respectively, with each of user identification information corresponding to each of the plurality of terminal apparatus respectively;
an acquisition unit that acquires the user identification information and program-specifying information;
a communicator that transmits the program-specifying information and information specifying an address of the server apparatus to a second terminal apparatus, when the acquisition unit acquires, from a first terminal apparatus, the program-specifying information and user identification corresponding to the second terminal apparatus, the second terminal apparatus being a transmission destination; and
a controller that specifies a second program processing apparatus corresponding to the access information associated with the user identification information corresponding to the second terminal apparatus, based on the association information stored in the storage, and cause the second program processing apparatus to perform processing regarding a broadcast program specified by the program-specifying information, when the acquisition unit acquires, from the second terminal apparatus, the program-specifying information and the user identification information corresponding to the second terminal apparatus.

10. The information processing system according to claim 9, wherein
the communicator transmits the program-specifying information and the information specifying the address of the server apparatus to the first terminal apparatus, when the acquisition unit acquires, from a first program processing apparatus, the program-specifying information that specifies a recorded broadcast program, and
the communicator transmits the program-specifying information and the information specifying the address of the server apparatus to the second terminal apparatus, when the acquisition unit acquires, from the first terminal apparatus, the program-specifying information and the user identification information corresponding to the second terminal apparatus.

11. The information processing system according to claim 9, wherein
the first program processing apparatus transmits the program-specifying information that specifies the broadcast program processed by the first program processing apparatus to the server apparatus, and
on receipt of the program-specifying information transmitted from the first program processing apparatus, the server apparatus adds additional information for accessing the server apparatus to the received program-specifying information to generate notification information, and then the server apparatus transmits the notification information to one of the terminal apparatus and an external device.

* * * * *